United States Patent
Kieffer et al.

(10) Patent No.: US 12,459,889 B2
(45) Date of Patent: Nov. 4, 2025

(54) SULFOBETAINE MONOMERS, PROCESS FOR PREPARING SAME, AND USES THEREOF

(71) Applicant: SNF GROUP, Andrezieux Boutheon (FR)

(72) Inventors: Johann Kieffer, Andrezieux Boutheon (FR); Cédrick Favero, Andrezieux Boutheon (FR); Benoît Legras, Andrezieux Boutheon (FR); Renaud Souzy, Andrezieux Boutheon (FR)

(73) Assignee: SNF GROUP, Andrezieux Boutheon (FR)

( * ) Notice: Subject to any disclaimer, the term of this patent is extended or adjusted under 35 U.S.C. 154(b) by 0 days.

(21) Appl. No.: 17/756,709

(22) PCT Filed: Dec. 15, 2020

(86) PCT No.: PCT/FR2020/052441
§ 371 (c)(1),
(2) Date: May 31, 2022

(87) PCT Pub. No.: WO2021/123599
PCT Pub. Date: Jun. 24, 2021

(65) Prior Publication Data
US 2023/0183174 A1    Jun. 15, 2023

(30) Foreign Application Priority Data
Dec. 16, 2019 (FR) ........................... 1914533

(51) Int. Cl.
| | | |
|---|---|---|
| *C09K 8/584* | (2006.01) | |
| *C07C 303/32* | (2006.01) | |
| *C07C 309/15* | (2006.01) | |
| *C08F 220/34* | (2006.01) | |
| *C08F 220/38* | (2006.01) | |
| *C08F 220/56* | (2006.01) | |
| *C09K 8/588* | (2006.01) | |
| *C09K 8/60* | (2006.01) | |
| *C09K 8/68* | (2006.01) | |
| *C09K 23/34* | (2022.01) | |
| *C11D 1/92* | (2006.01) | |
| *D21H 17/45* | (2006.01) | |
| *D21H 21/10* | (2006.01) | |

(52) U.S. Cl.
CPC .......... *C07C 309/15* (2013.01); *C07C 303/32* (2013.01); *C08F 220/34* (2013.01); *C08F 220/387* (2020.02); *C08F 220/56* (2013.01); *C09K 8/584* (2013.01); *C09K 8/588* (2013.01); *C09K 8/604* (2013.01); *C09K 8/685* (2013.01); *C09K 23/34* (2022.01); *C11D 1/92* (2013.01); *D21H 17/455* (2013.01); *D21H 21/10* (2013.01); *C07B 2200/13* (2013.01); *C08F 2800/10* (2013.01); *C08F 2810/20* (2013.01); *C09K 2208/28* (2013.01)

(58) Field of Classification Search
CPC ... C07C 309/15; C07C 303/32; C08F 220/34; C08F 220/387; C08F 220/56; C08F 2800/10; C08F 2810/20; C09K 8/584; C09K 8/588; C09K 8/604; C09K 8/685; C09K 23/34; C09K 2208/28; C11D 1/92; C11D 3/3796; C11D 3/0026; D21H 17/455; D21H 21/10; D21H 17/37; D21H 17/375; D21H 17/45; C07B 2200/13; C02F 1/56; C02F 11/147
See application file for complete search history.

(56) References Cited

U.S. PATENT DOCUMENTS

| | | | |
|---|---|---|---|
| 3,239,560 | A | 3/1966 | Cambre et al. |
| 3,473,998 | A | 10/1969 | Spriestersbach et al. |
| 4,585,846 | A | 4/1986 | Schulz et al. |
| 2020/0031765 | A1* | 1/2020 | Favero ................ E21B 43/16 |

FOREIGN PATENT DOCUMENTS

| | | | | |
|---|---|---|---|---|
| CN | 103274955 | | * | 5/2013 |
| CN | 103274955 | A | * | 9/2013 |
| CN | 104926696 | A | | 9/2015 |
| CN | 105130851 | A | | 12/2015 |
| CN | 107383287 | A | | 11/2017 |
| JP | S5973560 | | * | 4/1984 |
| WO | WO-2018172676 | A1 | * | 9/2018 ............... C02F 1/56 |

OTHER PUBLICATIONS

International Search Report (and English Translation) and Written Opinion for PCT/FR2020/052441, mailed Apr. 12, 2021.
Kazantsev O A et al. "Effect of Association on Nucleophilic Addition of (Meth)acrylic Aminoamides to Acrylic Acids in Aqueous Solutions" Russian Journal of General Chemistry, Ma I K Nau Ka—Interperiodica, RU, vol. 88. No. 4. Jun. 14, 2018 (Jun. 14, 2018). pp. 641-645.
Kazantsev O A et al. "Synthesis of Carboxy- and Sulfobetaines From Tertiary Amines and Unsaturated Acids" Russian Journal of Organic Chemistry, Ma I K Nau Ka—Interperiodica, RU, vol. 36, No. 3, Jan. 1, 2000 (Jan. 1, 2000), pp. 343-349.

(Continued)

*Primary Examiner* — Kumar R Bhushan
(74) *Attorney, Agent, or Firm* — HESLIN ROTHENBERG FARLEY & MESITI P.C.

(57) ABSTRACT

The invention relates to a novel sulfobetaine monomer and to a process for the preparation thereof, advantageously by reaction between a vinyl-amine compound and a vinyl-sulfonic acid compound, preferably in the presence of a solubilizing agent. The invention also relates to the (co)polymers obtained from this novel type of sulfobetaine monomer, and to the use thereof, for example as a flocculant, dispersing agent, thickening agent, absorbent agent or friction-reducing agent.

2 Claims, 11 Drawing Sheets

(56) References Cited

OTHER PUBLICATIONS

Shirshin K V et al. "Synthesis of Monomeric Betaines from N-Dimethylaminoalky l)methacry lamides" Russian Journal of Applied Chemistry, Pleiades Publishing, Moscow, vol. 72, No. 2, Jan. 1, 1990 (Jan. 1, 1990), pp. 278-281.
Sonnenschein et al., Synthesis of a series of monomeric styrene sulfobetaine precursors, Tetrahedron Letters, vol. 52, 2011, pp. 1101-1104 (Abstract).

* cited by examiner

SULFOBETAINE MONOMERS, PROCESS FOR PREPARING SAME, AND USES THEREOF

CROSS REFERENCE TO RELATED APPLICATIONS

This application is a national stage filing under section 371 of International Application No. PCT/FR2020/052441, filed on Dec. 15, 2020, and published on Jun. 24, 2021 as WO 2021/123599, which claims priority to French Application No. 1914533, filed on Dec. 16, 2019. The entire contents of WO 2021/123599 are hereby incorporated herein by reference.

TECHNICAL FIELD

The field of the invention relates to zwitterionic monomers and, more specifically, to new sulfobetaine monomers, as well as their preparation process and their use to produce (co)polymers.

PRIOR STATE OF THE ART

Zwitterionic monomers are unique in that they have at least one anionic charge and at least one cationic charge on the same monomeric unit. The cationic group is generally a quaternary ammonium. The anionic group is generally a carboxylic acid, a sulphonic acid, a phosphoric acid, a phosphonic acid or their salified forms. These zwitterionic monomers are also characterized by the group which separates the anionic charge and the cationic charge. Hydrophilic or hydrophobic groups may also be present on the monomeric unit.

Zwitterionic monomers are important given the specific characteristics they bring to the polymers obtained from them. Sulfobetaine monomers are a special type of zwitterionic monomer.

The sulfobetaine-type monomers described in the prior art often have the structure according to the formula (I) below in which x and y are integers and $R_1$ and $R_2$ are chosen from an alkyl, cyclic or heterocyclic group.

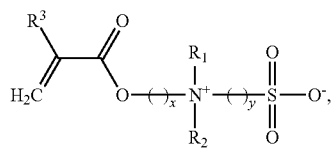

Formula (I)

with $R^3$=H or $CH_3$

The most cited molecule is the SPE monomer, in particular the one manufactured by Raschig as part of its Ralu®mer line. The structure of the Ralu®mer SPE corresponds to that of formula (I) in which x=2, y=3 and $R^3$=$CH_3$.

A variation of these structures consists of the introduction of a hydroxyl group between a positive charge (quaternary ammonium) and a negative charge (sulfonate). Rashig markets, in particular, the SHPE monomer of formula (II) below.

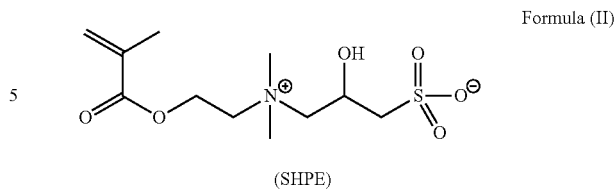

(SHPE)

There are also zwitterionic monomers with an acrylamido group, thus making it possible to obtain a stronger resistance to hydrolysis than zwitterionic monomers of the (meth) acrylic type. These structures are available from Rashig, for example in its Ralu®mer line under the names SPP of formula (III) and SHPP of formula (IV) below.

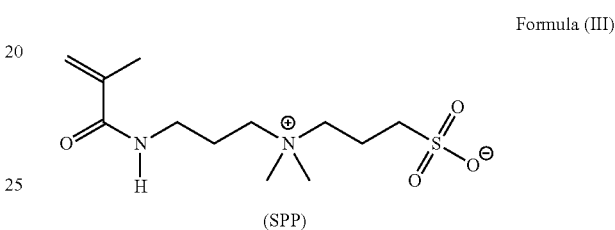

(SPP)

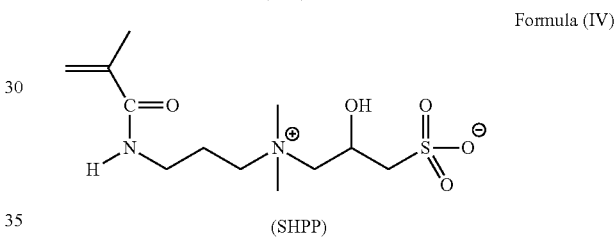

(SHPP)

These zwitterionic monomers may be obtained by different synthetic routes. Documents CN104926696, U.S. Pat. Nos. 3,473,998 and 4,585,846 describe, for example, the reaction between a monomer having a tertiary amine and a cyclic ester of sulfonic acid, otherwise called alkyl sultone.

The length of the alkyl chain generally varies from 3 to 7 carbon atoms.

The most commonly used reagents are generally propane sultone and butane sultone. But these compounds are highly toxic reagents with a carcinogenic, mutagenic and reprotoxic classification.

They are, therefore, highly undesirable. In addition, alkyl sultones hydrolyze in aqueous medium, which requires strict control of the water content in the reaction media, and thus makes the reaction conditions difficult.

Documents U.S. Pat. No. 3,239,560 and CN105130851 describe the use of a sodium hydroxyalkyl sulfonate halide as a reagent in order to dispense with the use of cyclic ester of the sulfonic acid. These hydroxyalkyl sulphonate halides are obtained by reaction between epichlorohydrin, which is a toxic compound, and sodium sulphite, or sodium bisulphite, or sodium metabisulphite. Therefore, the formation of the zwitterionic monomer takes place in two steps, and always with the use of a toxic compound. In addition, the use of sodium hydroxyalkyl sulfonate chloride with a tertiary amine generates an amount of salt (NaCl) that must be removed from the reaction medium, which makes the reaction more complex to manage. Finally, this type of reaction generates a non-negligible amount of by-products, which requires an additional step of purification by recrystallization of the sulfobetaine monomer thus synthesized. Therefore, these processes are not satisfactory.

The document "Synthesis of a series of monomeric styrene sulfobetaine precursors" (Lukas Sonnenschein and Andreas Seubert, Tetrahedron Letters, volume 52, 2011, pages 1101-1104) describes the use of sodium alkylsulfonate bromide as reagent. Alongside the sulfobetaine monomer obtained, salt (NaBr) is generated, which requires an additional stage of purification of the reaction medium. Therefore, this process is not satisfactory.

Consequently, it appears that obtaining new zwitterionic monomers, in particular sulfobetaines, of good purity, at a high yield while minimizing the use of toxic reagents, remains a major challenge.

DISCLOSURE OF THE INVENTION

The applicant discovered new sulfobetaine monomers, as well as their preparation process, which make it possible to achieve the aforementioned objectives.

The present invention relates to a sulfobetaine monomer of the formula (V) below, or its acid form, i.e., a monomer in which $SO_3H$ replaces $SO_3^-$. More particularly, the present invention relates to the hydrated crystalline form of this monomer, the preparation of this monomer (hydrated crystalline form or not), the preparation of a (co)polymer of this monomer (hydrated crystalline form or not), but also a (co)polymer of this monomer (in particular in its hydrated crystalline form) and its use.

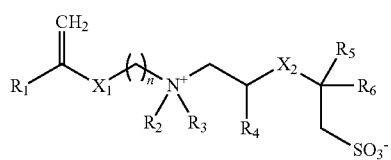

Formula (V)

A monomer "and/or" its acid form is understood to mean either a monomer, or the acid form of the monomer, or a monomer and its acid form.

The invention relates both to the zwitterionic form of the molecule, i.e., that which comprises at least one positive charge and at least one negative charge on the same molecule, and to the acid form, the latter being present in an acid medium when a proton, $H^+$ neutralizes the negative charge of the $SO_3^-$ function. In the present application, the expression "sulfobetaine monomer of formula (V), or its acid form" is used to describe these two molecules.

Another aspect of the invention relates to a process for preparing the monomer of formula (V) and/or its acid form by reaction between a compound of formula (VI) and a compound of formula (VII) and/or one of its salts. This reaction is optionally, and preferably, carried out in the presence of at least one agent solubilizing the compound of formula (VII). Advantageously, this reaction may also be carried out in the presence of at least one solvent.

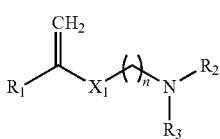

Formula (VI)

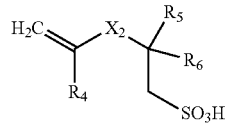

Formula (VII)

In formulas (V) to (XIV):

$R_1$ and $R_4$ are, independently of each other, —H or —$CH_3$, $R_2$ and $R_3$ are, independently of each other, a linear C1-C10 alkyl or a branched C3-C10 alkyl or a linear C2-C10 alkylene group, $R_5$ is —H, or a linear C1-C22 alkyl or a branched C3-C22 alkyl group, or $R_5$ forms an optionally branched C4-C10 carbon ring with $R_6$, $R_6$ is a linear C1-C22 alkyl or a branched C3-C22 alkyl group, or R6 forms an optionally branched C4-C10 carbon ring with $R_5$, $X_1$=—COO—, or —CONH—, or —$CH_2$—, $X_2$=—COO—, or —CONH—, n is an integer between 0 and 10.

In general, the ranges of values include the bounds defining them. Thus, bounds 0 and 10 are included in the "between 0 and 10" range.

In the present application, —COO— corresponds to a carbon atom connected by a double covalent bond to a first oxygen atom, and connected by a single covalent bond to a second oxygen atom, i.e., the group —C(=O)O—. The —CONH— group corresponds to a carbon atom linked by a double covalent bond to an oxygen atom, and linked by a single covalent bond to a nitrogen atom, itself linked by a covalent bond to an atom of hydrogen, i.e., the —C(=O) NH— group. The carbon of the C=O group of $X_2$ (—COO— or —CONH—) naturally forms a covalent bond with the carbon of the —$CHR_4$— group of formula (V). n=0 means that $(--)_n$ is a single bond between $X_1$ and $NR_2R_3$.

When $R_i$ (i=2 and/or 3) is a linear $C_2$-$C_{10}$ alkylene group, it advantageously comprises a single C=C double bond, more advantageously a —CH=$CH_2$ group.

By way of example, a $C_1$-$C_{20}$ group advantageously corresponds to a hydrocarbon group comprising 1 to 20 carbon atoms. Advantageously, a hydrocarbon group only comprises carbon and hydrogen atoms.

In the present application, the salts of the sulfobetaine monomers of formula (V) and of the compound of formula (VII) are hydrosoluble salts of these monomers such as alkali metal salts, alkaline-earth metal salts, or ammonium salts.

By "alkaline" or "alkali metal" is meant a chemical element from the first column (1st group) of the periodic table, with the exception of hydrogen, namely an element chosen from lithium, sodium, potassium, rubidium, cesium and francium, preferably sodium or potassium.

By "alkaline-earth" or "alkaline-earth metal" is meant a chemical element from the second column (2nd group) of the periodic table, namely an element chosen from beryllium, magnesium, calcium, strontium, barium and radium, preferably calcium or magnesium.

Another aspect of the invention relates to the use of the sulfobetaine monomer of formula (V) and/or one of its salts, for the production of (co)polymers.

Another aspect of the invention relates to the (co)polymers obtained from sulfobetaine monomers of formula (V) and/or its acid form.

The invention also relates to the use of the (co)polymer obtained from sulfobetaine monomers of formula (V) and/or its acid form as a flocculant, dispersant, thickening agent (rheology modifier), absorbing agent (for example, superabsorbent of the SAP type which swells in the presence of water), friction reducing agent, water retaining agent, mineral filler retaining agent, or foam generator and stabilizer. Said (co)polymer may have one or more of these properties.

The invention also relates to the use of (co)polymers obtained from sulfobetaine monomers of formula (V) and/or its acid form, in oil and gas recovery, water treatment, sludge treatment, in improving aqueous fluid transport in pulp processing, in papermaking, construction, mining, cosmetics formulation, detergent formulation, textile manufacturing, agriculture, or medical hydrogels manufacturing.

Finally, the invention also relates to compositions for hygiene products, cosmetic compositions, shampoo compositions, or pharmaceutical compositions containing a (co) polymer comprising at least the sulfobetaine monomer of formula (V) and/or its acid form, as well as the process for manufacturing said compositions.

Sulfobetaine Monomer

The present invention relates to a sulfobetaine monomer of the formula (V) below, or its acid form.

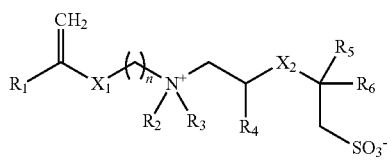

Formula (V)

According to a particular embodiment, the group $R_1$ of formula (V) is a hydrogen atom.

According to a first particular embodiment of the invention, the sulfobetaine monomer has a structure of formula (V) in which n is equal to 3. In this case, and preferably, $R_2$ and $R_3$ are each a $CH_3$ group, and $X_1$ is CONH.

According to a second particular embodiment of the invention, the sulfobetaine monomer has a structure of formula (V) in which n is equal to 0. In this case, and preferably, $R_2$ and $R_3$ are each a $CH_3$ group, and $X_1$ is a —$CH_2$— group.

According to a third particular embodiment of the invention, the sulfobetaine monomer has a structure of formula (V) in which n is equal to 2. In this case, and preferably, $R_2$ and $R_3$ are each a $CH_3$ group and $X_1$ is —COO—.

Preferably, $R_4$ is a hydrogen atom, and $X_2$ is —CONH—. In this case, $R_5$ and $R_6$ are preferably $CH_3$ groups. These preferences generally apply to formula (V), and preferably to one of the first three particular embodiments previously described.

According to a fourth particular, and preferred, embodiment of the invention, the sulfobetaine monomer is a monomer with the structure of formula (VIII) below or its acid form. This monomer is called MAAMPS, more precisely 2-(3-((2-(methacryloyloxy) ethyl) dimethylammonio) propanamido)-2-methylpropane-1-sulfonate.

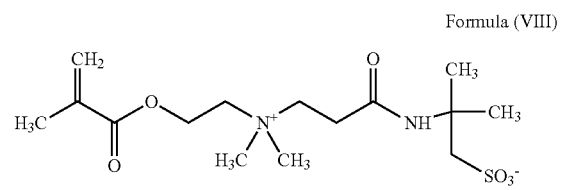

Formula (VIII)

According to a fifth particular, and preferred, embodiment of the invention, the sulfobetaine monomer is a monomer with the structure of formula (IX) below or its acid form. This monomer is called MAMMPS monomer, more precisely 2-(3-((2-methacrylamidopropyl)dimethylammonio) propanamido)-2-methylpropane-1-sulfonate.

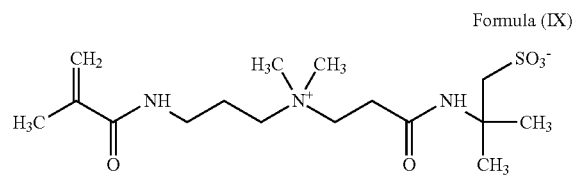

Formula (IX)

According to a sixth particular, and preferred, embodiment of the invention, the sulfobetaine monomer is a monomer with the structure of formula (X) below or its acid form. This monomer is called ALMPS, more precisely 2-(3-(allyldimethylammonio)propanamido)-2-methylpropane-1-sulfonate.

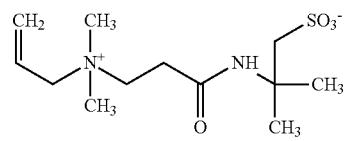

Formula (X)

According to a seventh particular, and preferred, embodiment of the invention, the sulfobetaine monomer is a monomer with the structure of formula (XI) below or its acid form. This monomer is called AAMPS, more precisely 2-(3-((2-(acryloyloxy)ethyl)dimethylammonio)propanamido)-2-methylpropane-1-sulfonate.

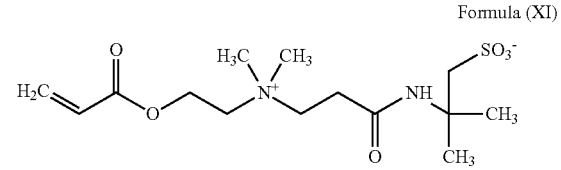

Formula (XI)

According to an eighth particular, and preferred, embodiment of the invention, the sulfobetaine monomer is a monomer with the structure of formula (XII) below or its acid form. This monomer is called AMMPS, more precisely 2-(3-((2-acrylamidopropyl)dimethylammonio)propanamido)-2-methylpropane-1-sulfonate.

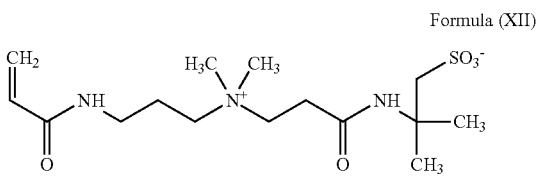

Formula (XII)

According to a ninth particular, and preferred, embodiment of the invention, the sulfobetaine monomer is a monomer with the structure of formula (XIII) below or its acid form. This monomer is called DAMPS, more precisely 2-(3-(diallylmethylammonio)propanamido)-2-methylpropane-1-sulfonate.

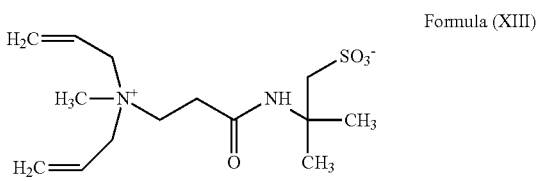

Formula (XIII)

According to a tenth particular, and preferred, embodiment of the invention, the sulfobetaine monomer of formula (V) is in a hydrated crystalline form.

According to an eleventh particular, and preferred, embodiment of the invention, the sulfobetaine monomer of formula (VIII) is in a hydrated crystalline form having an X-ray powder diffraction diagram comprising the following characteristic peaks:

6.19°, 7.66°, 8.70°, 10.20°, 10.73°, 11.85°, 12.38°, 13.98°, 15.39°, 16.11°, 16.76°, 17.23°, 17.72°, 18.23°, 18.66°, 19.24°, 19.63°, 20.06°, 20.53°, 21.02°, 21.65°, 22.31°, 23.00°, 24.02°, 25.17°, 26.11°, 26.36°, 27.36°, 28.07°, 29.08°, 29.48, 29.91° 2-theta degrees. The uncertainty is generally of the order of +/−0.05°.

Process P1 for Preparing the Sulfobetaine Monomer of Formula (V)

The invention also relates to a process P1 for preparing the monomer of formula (V) and/or its acid form by reaction between a compound of formula (VI) and a compound of formula (VII) and/or one of its salts, optionally and preferably in the presence of at least one solubilizing agent, and optionally in the presence of at least one solvent.

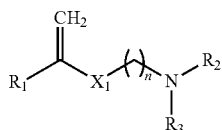

Formula (VI)

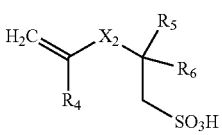

Formula (VII)

In the preparation process according to the invention, the same preferences on the characteristics $R_1$ to $R_6$, $X_1$, $X_2$, and n previously described for the sulfobetaine monomer, apply to the formulas (VI) and (VII).

Thus, the compound of formula (VI) is preferably chosen from dimethylaminopropyl methacrylamide, dimethylethylaminopropyl acrylamide, allyldimethylamine, diallylmethyl amine, dimethylaminoethyl methacrylate, dimethylaminoethyl acrylate. More preferably, the compound of formula (VI) is chosen from dimethylaminopropyl methacrylamide, acrylamide, allyldimethylamine and dimethylaminoethyl acrylate. Even more preferably, it is either dimethylaminopropyl methacrylamide or dimethylaminopropyl acrylamide.

As regards the compound of formula (VII), the use of its acid form is preferred to that of its salified form in process P1. The compound of formula (VII) is preferably 2-acrylamido-2-methylpropane sulphonic acid and/or one of its salts, preferably its acid form. According to a particular embodiment, the 2-acrylamido-2-methylpropane sulphonic acid is in its monohydrate form as described in document WO 2018/172676.

According to the process of the invention, it is possible to react several amines (compound (VI)) with the compound of formula (VII) in the same reaction. In other words, the process according to the invention also covers the reaction of at least two compounds of formula (VI) with at least one compound of formula (VII). The product of the reaction will then contain several different molecules of formula (V). In the same way, it is possible to react at least one compound of formula (VI) with at least two compounds of formula (VII).

The reaction between the compounds of formula (VI) and (VII) is preferably carried out in the presence of an agent for solubilizing the compound of formula (VII) in the reaction medium. When at least one solubilizing agent is present in the reaction medium during the reaction, the reaction yield is improved. The reaction may be carried out without a solubilizing agent, but it is preferable that it be carried out in the presence of at least one solubilizing agent.

In the context of the invention, a solubilizing agent is a compound allowing partial or total solubilization of the compound of formula (VII) in the reaction medium. The terms "solubilizer" and "solubilizing agent" are used equivalently in the present application. In other words, the solubilizing agent is an agent solubilizing the compound of formula (VII) in the reaction medium. Thanks to its presence, the solubility of the compound of formula (VII) is improved in the reaction medium. This is how these compounds can more effectively participate in the reaction. The solubilization may be partial, the solubilized part reacting with the compound of formula (VI) to form the compound of formula (V), then it is another fraction of compound of formula (VII) which is solubilized and which then reacts, and so on, so that, substantially, all of the compounds of formula (VII) are eventually solubilized and reacted at the end of the reaction.

The solubilizing agent is preferably chosen from water, an alkane, an alcohol, an amide, for example N-methylpyrrolidone, or a mixture of these compounds. More preferably, the solubilizing agent is chosen from water, methanol, ethanol, isopropanol, dimethylformamide, or a mixture of these compounds. Even more preferably, the solubilizing agent is water.

The amount of solubilizing agent is preferably between 0 and 200% by mass relative to the mass of the compound of formula (VII), preferably between 0.0001 and 150% by mass, even more preferably between 0.001 and 100% by mass, and even more preferably between 0.1 and 80% by mass. The amount of solubilizing agent (solubilizing agent) is preferably greater than 0.5%, more preferably greater than 1%, even more preferably greater than 2%, and even more preferably greater than 5% by mass.

It is possible to optimize the reaction by adjusting the amount of solubilizing agent according to the precise nature of the compounds (VI) and (VII). In other words, the optimum reactivity and yield obtained with the same amount of solubilizing agent depends on the nature of the compounds (VI) and (VII), in particular the compound (VII). A person skilled in the art is able to easily perform this optimization.

When compound (VI) is dimethylaminoethyl methacrylate or diallylmethylamine (DAMA) and compound (VII) is 2-acrylamido-2-methylpropane sulfonic acid and/or one of its salts, the amount of solubilizing agent is preferably between 0% and 50% by mass relative to the total mass of the compounds (VI) and (VII), and of the optional solubilizing agent(s) and solvent(s), more preferably between 0.01% and 40% by mass. The amount of solubilizing agent is preferably greater than 0.5%, more preferably greater than 1%, even more preferably greater than 2%, and even more preferably greater than 5% by mass. The solubilizing agent is preferably water.

When compound (VI) is dimethylaminoethyl acrylate and compound (VII) is 2-acrylamido-2-methylpropanesulfonic acid and/or one of its salts, the amount of solubilizing agent is preferably between 0% and 20% by mass relative to the total mass of the compounds (VI) and (VII), and any eventual solubilizing agents and solvents, more preferably between 0.01% and 15% by mass. The amount of solubilizing agent is preferably greater than 0.5%, more preferably greater than 1%, and even more preferably greater than 2% by mass. The solubilizing agent is preferably water.

When compound (VI) is dimethylaminopropyl methacrylamide (DMAPMA) or dimethylaminopropyl acrylamide (DMAPAA) or allyldimethylamine (ADMA), and compound (VII) is 2-acrylamido-2-methylpropane sulfonic acid and/or one of its salts, the amount of solubilizing agent is preferably between 0 and 50% by mass relative to the total mass of the compounds (VI) and (VII), and of any eventual solubilizing agent(s) and solvent(s), more preferably between 0.01% and 30% by mass. The amount of solubilizing agent is preferably greater than 0.5%, more preferably greater than 1%, even more preferably greater than 2%, and even more preferably greater than 5% by mass. The solubilizing agent is preferably water.

The preparation process according to the invention may be carried out discontinuously, i.e., in batches, in a semi-discontinuous manner, i.e., in semi-batches, or continuously. Preferably, it is carried out in batches. The addition of the compounds of formula (VI) or (VII) and, optionally, of the solubilizing agent, may be done separately or simultaneously. The compound of formula (VI) may be added first to the reactor, followed by the addition of the compound of formula (VII), or vice versa. The first of these configurations is preferred (compound (VI) then compound (VII)). The addition of each component may be done in a single step, several steps, or in gradual pouring. The compounds of formula (VI), formula (VII) and the optional solubilizing agent may be added to a reactor in any order. When a solubilizing agent is used, the preparation process according to the invention preferably comprises a first step in which the solubilizing agent is added and mixed with the compound of formula (VI), and, in a second step, the compound of formula (VII) is added to the reaction medium.

The reaction between the compounds of formulas (VI) and (VII) is preferably carried out with stirring. The stirring speed is preferably between 10 and 1000 rpm.

The temperature of the reaction between the compounds of formulas (VI) and (VII) is preferably between −20° C. and 100° C., more preferably between 0° C. and 50° C. The optimum reaction temperature is preferably between 1° and 40° C., even more preferably between 15 and 35° C., even more preferably between 15 and 25° C. A better performance is generally obtained under these optimal conditions.

The duration of the reaction between the compounds of formulas (VI) and (VII) is advantageously between 0.5 hour and 10 days, preferably between 1 hour and 7 days, more preferably between 2 hours and 72 hours.

The molar ratios of the reagents are typically determined by a person skilled in the art so as to maximize the production of sulfobetaine monomer of formula (V) and/or its acid form. The molar ratio between the compound of formula (VI) and the compound of formula (VII) and/or one of its salts is preferably between 0.1:1 and 20:1, more preferably between 1.01:1 and 20:1, and even more preferably between 1.1:1 and 15:1. The molar ratio may in particular be between 6:1 and 10:1, or between 8:1 and 10:1.

When this ratio is between 0.1:1 and 1:1, an additional compound is advantageously used so that the molar ratio between the amount of compound of formula (VI) added to the amount of additional compound over the amount of compound of formula (VII) is advantageously greater than or equal to 1.

This additional compound is advantageously chosen from alkali metal hydroxides, alkaline earth metal hydroxides, alkali metal oxides, alkaline earth metal oxides, alkali metal carbonates, alkaline earth metal carbonates, alkali metal hydrogen carbonates, alkaline earth metal hydrogen carbonates or amines of the following formula $NR_{10}R_{20}R_{30}$ where $R_{10}$, $R_{20}$ and $R_{30}$ are each independently a hydrogen atom or a carbon chain containing from 1 to 22 carbon atoms, for example, an alkyl in C1-C22. Preferably, $R_{10}$, $R_{20}$ and $R_{30}$ are each a hydrogen atom.

When the additional compound is an alkali metal or alkaline-earth metal hydroxide, it is preferably chosen from sodium hydroxide, potassium hydroxide, lithium hydroxide, magnesium hydroxide and potassium hydroxide. calcium, When the additional compound is an alkali metal or alkaline-earth metal oxide, it is preferably calcium oxide or magnesium oxide. When the additional compound is an alkali metal carbonate, it is preferably sodium carbonate or potassium carbonate. When the additional compound is an alkali metal hydrogen carbonate, it is preferably sodium hydrogen carbonate or potassium hydrogen carbonate. Preferably, the additional compound is sodium carbonate or potassium carbonate.

The pressure at which the reaction between the compounds of formulas (VI) and (VII) takes place is preferably between 0.1 bar and 50 bar, more preferably between 0.5 and 10 bar, and even more preferably at atmospheric pressure. "Bar" is understood to mean absolute bar corresponding to $10^5$ Pa.

According to a particular embodiment, a solvent may also be used in the process according to the invention. In the context of the invention, a "solvent" is a compound making it possible to dilute the reaction medium without chemically modifying the reagents, and without modifying itself. The solvent may advantageously be chosen from alkanes, ketones, nitriles, alcohols and ethers, and more preferably the solvent is acetone. In a preferred embodiment, the solvent is a compound having a melting temperature below 15° C., more preferably below 5° C. Indeed, solvents whose melting point is higher than 15° C. can lower the yield of the reaction, especially when it comes to polar and aprotic solvents.

A person skilled in the art will be able to adjust the amount of solvent in order to optimize the reaction.

The reaction is carried out with an amount of polymerization inhibitor of between 0 and less than 500 ppm relative to the total mass of the compounds of formulas (VI) and (VII).

When the reaction is carried out in the presence of a polymerization inhibitor, an amount less than 500 ppm is preferably used relative to the total mass of the reagents (compounds of formulas (VI) and (VII)), preferably less than 200 ppm, more preferably less than 100 ppm, even more preferably less than or equal to 50 ppm. It is possible to use an amount greater than or equal to 10 ppm, or even greater than or equal to 20 ppm. It was observed that the use of an excessive amount of polymerization inhibitor lowers the yield of the reaction. Reducing the amount of polymerization inhibitor compared to the usual amounts (which are generally greater than 5000 ppm), preferably to less than 500 ppm, makes it possible to improve both the reaction yield and the purity of the product obtained. A reduction in the amount of polymerization inhibitor to 50 ppm or less makes it possible to further improve the reaction yield and the purity of the product obtained, and more significantly than by keeping an amount of polymerization inhibitor greater than 50 ppm.

On the contrary, the processes of the prior art, in particular those described in the documents CN 103274955, CN 107383287, Kazantsev et al., Russian Journal of General Chemistry, 2018, vol. 88 No. 4, pages 641-645, Kazantsev et al., Russian Journal of Organic Chemistry, 2000, vol. 36 No. 3, pages 343-349, and Shirshin et al., Russian Journal of Applied Chemistry, 1990, vol. 72 No. 2, pages 278-281, use an amount of polymerization inhibitor greater than or equal to 1000 ppm, and generally between 1000 ppm and 5000 ppm. This translates into a lower reaction yield and purity compared to the amounts described above in the context of the present invention.

Preferably, the polymerization inhibitor is chosen from the group comprising monomethyl hydroquinone ether (EMHQ), hydroquinone, benzoquinone, phenothiazine, phenylnaphthylamine, diphenylpicrylhydrazine.

Preferably, the reaction is carried out without a polymerization inhibitor.

In the process of the invention, the solubilizing agent facilitates the solubilization of the compound of formula (VII) in the reaction medium. Then, the solubilized molecules of formula (VII) react with the compounds of formula (VI) to lead to the formation of the sulfobetaine monomer of formula (V).

The product of the reaction obtained may be a suspension of crystals of compounds of formula (V) or a solution of compounds of formula (V). In other words, the compound of formula (V) obtained at the end of the reaction is in solid (crystals) or liquid (solubilized) form. The product of the reaction, and therefore the physical state of the compound of formula (V), depends on the presence or absence of solubilizing agent and/or solvent, as well as on their amount in the reaction medium. In the case where crystals of sulfobetaine monomer of formula (V) are obtained at the end of the reaction, they are then preferably separated from the reaction medium by a liquid/solid separation step. By way of example, and without limitation, the use of a vertical or horizontal centrifuge, decanter, filter press, belt filter, disc filter, rotary drum under vacuum or under pressure may be cited.

Preferably, the crystals obtained following the liquid/solid separation step are optionally washed one or more times, then dried. Any washing and drying process may be used. Thus, the final product obtained is a crystal powder of formula (V) compounds. The washing may be carried out with an alcohol or a ketone such as, for example, acetone.

The process for preparing sulfobetaine monomer of formula (V) and/or its acid form preferably comprises the following successive steps:
 a1) Adding to a stirred reactor at least one compound of formula (VI), optionally and preferably at least one solubilizing agent for the compound of formula (VII), and optionally a solvent to obtain a pre-reaction mixture;
 a2) Adding at least one compound of formula (VII) and/or one of its salts to the pre-reaction mixture;
 a3) After reaction between the compounds of formulas (VI) and (VII), which makes it possible to obtain a sulfobetaine monomer of formula (V) and/or its acid form, obtain a sulfobetaine monomer of formula (V) and/or its acid form acid in the form of a solution or a suspension of crystals.

When the product of the reaction is a suspension of crystals, the process according to the invention preferably comprises a subsequent step of separating the crystals, optionally followed by one or more washing steps, optionally followed by a subsequent step of drying the crystals. When the product of the reaction is a monomer solution, a powder may be obtained after drying.

According to a particular embodiment of the invention, the liquid obtained during the crystal separation step may be recycled. In other words, it may be implemented again in a new reaction according to the process of the invention. Indeed, the liquid may contain a part of compound of formula (VI) and formula (VII) and, optionally, of the solubilizing agent and/or the solvent. With a view to optimizing the raw materials involved in the reaction, a person skilled in the art will know how to implement this particular embodiment of the invention and adjust the additional amounts of compounds of formula (VI), of formula (VII), and, optionally, of solubilizing agent and/or solvent, for the implementation of this liquid during a new reaction of the invention.

When the product of the reaction is a solution, it may be concentrated or diluted. In the light of these circumstances, a person skilled in the art will be able to adjust the reaction parameters in order to optimize the reaction and its yield. Techniques known to a person skilled in the art may be used for this purpose.

Process P2 for preparing the sulfobetaine monomer of formula (V) in a hydrated crystalline form According to a particular embodiment of the invention, it is possible to obtain a product of the reaction corresponding to a hydrated crystalline form of the compound of formula (V). Process P2 also, and advantageously, involves the use of the characteristics mentioned above for process P1. According to this particular embodiment, two alternatives are possible.

The first alternative consists in carrying out steps a1) to a3) of process P1 using water as a solubilizing agent in an amount sufficient for forming a hydrated crystalline form of the compound of formula (V). More specifically, the amount of water used as solubilizing agent in the reaction of the process according to the invention is preferably at least 10% by mass, preferably at least 20%, 30%, 40%, or even more preferably at least 50% by mass relative to the total mass of the compounds (VI) and (VII), and of the optional solubilizing agent(s) and solvent(s). A person skilled in the art will know how to adjust the amount of water depending on the nature of the compounds of formula (VI) and (VII) in order to obtain crystals of the hydrated crystalline form of the compound of formula (V).

According to a first embodiment, the second alternative consists in carrying out the following steps: a1) Adding to a stirred reactor at least one compound of formula (VI), optionally at least one solubilizing agent of the compound of formula (VII), and optionally a solvent to obtain a pre-reaction mixture;

- a2) Adding at least one compound of formula (VII) and/or one of its salts to the pre-reaction mixture;
- a3) After reaction, obtaining sulfobetaine monomers of formula (V) and/or its acid form in the form of a solution;
- a4) Extracting the compound of formula (V) in the form of crystals AA;
- a5) Combining the crystals AA of the compound of formula (V) with an aqueous solution to form a suspension A;
- a6) Mixing suspension A for a period of between 1 minute and 20 hours;
- a7) Obtaining a suspension B of crystals BB of the compound of formula (V) in a hydrated form;
- a8) Optionally isolating the crystals BB obtained from suspension B.

According to a second embodiment, the second alternative does not include step a4) and consists in carrying out the following steps:

- a1) Adding to a stirred reactor at least one compound of formula (VI), optionally at least one solubilizing agent of the compound of formula (VII), and optionally a solvent to obtain a pre-reaction mixture;
- a2) Adding at least one compound of formula (VII) and/or one of its salts to the pre-reaction mixture;
- a3) After reaction, obtaining sulfobetaine monomers of formula (V) and/or its acid form in the form of a suspension of crystals AA;
- a5) Combining the crystals AA of the compound of formula (V) with an aqueous solution to form a suspension A;
- a6) Mixing suspension A for a period of between 1 minute and 20 hours;
- a7) Obtaining a suspension B of crystals BB of the compound of formula (V) in a hydrated form;
- a8) Optionally isolating the crystals BB obtained from suspension B.

A person skilled in the art will know how to adjust the reaction parameters so as to obtain a solution or a suspension of crystals AA at the end of step a3).

According to the embodiments of this second alternative embodiment, it is preferable, first of all, to isolate the compounds of formula (V) in their crystalline form AA. For this, an extraction step is performed when the product of the reaction is a solution or a liquid/solid separation step when the product of the reaction is a suspension. The extraction step may be done using any technique known to a person skilled in the art such as evaporation, crystallization (for example by cooling) or membrane separation.

The crystals AA obtained are then combined with an aqueous solution to form a suspension A, the latter preferably comprising at least 80% by mass of water, preferably at least 90%, 95%, or more preferably at least 99% by mass of water. Preferably, the aqueous solution is water. The aqueous solution may comprise up to 20% by mass of organic solvent, preferably from 0 to 15%, more preferably from 0 to 10%.

The organic solvent is preferably chosen from acids (for example, carboxylic acids) comprising from 1 to 8 carbon atoms, amides comprising from 1 to 8 carbon atoms, alcohols comprising from 1 to 8 carbon atoms, ketones comprising from 3 to 8 carbon atoms, ethers comprising from 2 to 8 carbon atoms, esters comprising from 2 to 8 carbon atoms, alkanes comprising from 1 to 8 carbon atoms, halogenated hydrocarbons comprising from 1 to 8 carbon atoms, nitriles comprising from 2 to 8 carbon atoms or mixtures thereof.

Crystals AA may be in powder form or shaped by processes such as compaction, granulation or extrusion.

The mass ratio of aqueous solution relative to the crystals AA is between 1:0.5 and 1:2, preferably between 1:1 and 1:1.5.

The combination of the aqueous solution with the crystals AA may be done in one step or sequentially in several steps.

The step of mixing suspension A is generally done for a period of between 1 minute and 20 hours, preferably between 30 minutes and 8 hours, more preferably between 2 and 5 hours. The mixing temperature is generally between 1° C. and 40° C. The lower temperature limit depends on the composition and physical characteristics of solution or suspension A.

The mixing of suspension A may be done using various instruments. By way of example, and without limitation, mention may be made of reactors with an agitator, loop reactors, static mixers, microreactors, piston reactors, paddle mixers, twin-cone mixers, plowshare mixers, or rotary-disc mixers.

When suspension A is mixed, crystals BB of compound of formula (V) are formed in a hydrated form. At the end of the crystallographic transformation reaction, a suspension B is obtained which contains crystals BB of the compound of formula (V) in a hydrated form.

A step of isolating the crystals BB of the compound of formula (V) in a hydrated form may then be carried out by solid/liquid separation. The solid/liquid separation may be done, by way of example, and without limitation, using a horizontal or vertical centrifuge, a decanter, a filter press, a belt filter, a disc filter, or a rotary drum filter. The liquid/solid separation may also be carried out by gravity settling.

The composition obtained at the end of the isolation step preferably comprises between 40 and 99% by mass of crystals BB of compound of formula (V) in a hydrated form, more preferably between 60 and 98% by mass. The rest of the composition is mostly water.

The crystals BB obtained at the end of the isolation step may be dried. However, preferably, the crystals BB are not dried.

For the sake of industrial optimization and recycling chemical compounds, the liquid phase obtained following the liquid/solid separation, which contains water, optionally non-crystallized sulfobetaine monomers of formula (V) and, optionally, organic solvent, may be totally or partially used as an aqueous solution to be brought into contact with the crystals AA.

According to one embodiment, the reaction is carried out with an amount of polymerization inhibitor of between 0 and less than 500 ppm relative to the total mass of the compounds of formulas (VI) and (VII).

When the reaction is carried out in the presence of a polymerization inhibitor, an amount of less than 500 ppm relative to the total mass of the reagents (compounds of formulas (VI) and (VII)) is used, preferably less than 200 ppm, more preferably less than 100 ppm, even more preferably less than or equal to 50 ppm. It is possible to use an amount greater than or equal to 10 ppm, or even greater than or equal to 20 ppm. As described above, the use of a small amount of polymerization inhibitor makes it possible to maximize the reaction yield and the purity of the product obtained. Preferably, the polymerization inhibitor is chosen from the group comprising monomethyl hydroquinone ether (EMHQ), hydroquinone, benzoquinone, phenothiazine, phenylnaphthylamine, diphenylpicrylhydrazine.

Preferably, the reaction is carried out without a polymerization inhibitor.

Polymer Obtained from the Sulfobetaine Monomer

The invention also relates to the use of the sulfobetaine monomer of formula (V) and/or its acid form, for the production of (co)polymers, as well as the (co)polymers obtained from sulfobetaine monomers of formula (V) and/or their acid form(s).

In other words, the invention also relates to a process for preparing a (co)polymer of sulfobetaine monomer of formula (V) and/or its acid form, comprising the following steps:
  preparing the sulfobetaine monomer of formula (V) and/or its acid form, in a hydrated or non-hydrated crystalline form, by the preparation process P1 or P2 described above,
  (co)polymerizing at least the sulfobetaine monomer obtained to form the (co)polymer.

According to a particular embodiment of the invention, the polymer is obtained solely from the sulfobetaine monomer of formula (V) and/or its acid form.

According to another particular embodiment of the invention, the polymer is a copolymer comprising at least one sulfobetaine monomer of formula (V) and/or its acid form and at least one other generally hydrosoluble monomer.

The hydrosoluble monomer may be a non-ionic monomer which may, in particular, be chosen from the group comprising hydrosoluble vinyl monomers, and particularly acrylamide; methacrylamide; N-isopropylacrylamide; N,N-dimethylacrylamide; N-vinylformamide; acryloyl morpholine; N,N-diethyl acrylamide; N-tert-butyl acrylamide; N-tert-octylacrylamide; N-vinylpyrrolidone; N-vinyl caprolactam; N-vinyl-imidazole, hydroxyethyl methacrylamide, hydroxypropylacrylate, isoprenol and diacetone acrylamide, 2-(diethylaminoethyl) methacrylate (DEAEMA) in a salified form, maleic anhydride, hydroxyethylacrylamide (HEAA), N-vinylsuccinimide, a monomer of formula (XIV), and mixtures thereof.

Formula (XIV)

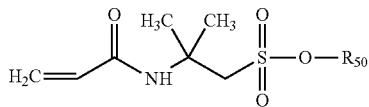

R50 is an alkyl group advantageously comprising from 1 to 10 carbon atoms.

The nonionic monomer may also be chosen from the monomers of formula:

D-Z-D' where:
  D is a polymerizable unsaturated chemical function of the acrylate, methacrylate, acrylamido, methacrylamido, vinyl or allylic type,
  D' represents hydrogen or an alkyl (advantageously C1-C22) or aryl (advantageously C1-C22) group,
  Z has the following structure:—(OE)w-(OP)x-(OBu)z- where:
    OE, OP, OBu designate respectively ethylene oxide, propylene oxide and butylene oxide,
    The arrangement between the different patterns of OE and/or OP and/or OBu may be statistical, alternating, gradient or block,
    w, x and z are integers comprised, independently of each other, between 0 and 150, and w+x+z≠0.

Advantageously, the nonionic monomer is acrylamide.

The hydrosoluble monomer may also be chosen from the group of anionic monomers. The anionic monomer(s) that may be used in the context of the invention may be chosen from a wide group. These monomers may have a vinyl function, in particular acrylic, or a maleic, fumaric, malonic, itaconic, or allylic function. They may also contain a carboxylate, phosphonate, phosphate, sulfate, sulfonate, or other anionically charged group. The anionic monomer may be in the acid form, or else in the form of an alkaline earth metal salt, an alkali metal salt or an ammonium salt. Examples of suitable monomers include acrylic acid; methacrylic acid; itaconic acid; monomethyl itaconic acid; crotonic acid; maleic acid; fumaric acid; monomers of strong acid type having, for example, a function of the sulphonic acid or phosphonic acid type, such as vinyl sulphonic acid, vinyl phosphonic acid, allyl sulphonic acid, methallyl sulphonic acid, 2-methylidenepropane-1,3-disulfonic acid, 2-sulfoethylmethacrylate, sulfopropylacrylate, allylphosphonic acid, styrenesulfonic acid; and the hydrosoluble salts of these monomers such as their alkali metal, alkaline earth metal, or ammonium salts.

The hydrosoluble monomer may be a cationic monomer of vinyl type, in particular acrylamide, acrylic, allylic or maleic having an ammonium function, in particular quaternary ammonium, phosphonium, or sulfonium. Mention may be made, in particular and without limitation, of quaternized or salified dimethylaminoethyl acrylate (ADAME), and quaternized or salified dimethylaminoethyl methacrylate (MADAME), quaternized or salified allylamine, quaternized or salified allydimethylamine, quaternized or salified diallylmethylamine, dimethyldiallylammonium chloride (DADMAC), quaternized or salified dimethylaminopropyl acrylamide, acrylamido propyltrimethyl ammonium chloride (APTAC), quaternized or salified dimethylaminopropyl methacrylamide, and methacrylamido propyltrimethyl ammonium chloride (MAPTAC).

According to the invention, the (co)polymer may have a linear, branched, reticulated, star-shaped or comb-shaped structure. These structures may be obtained by selecting the initiator, the transfer agent, the polymerization technique such as the controlled radical polymerization called Reversible-Addition Fragmentation chain Transfer (RAFT), Nitroxide Mediated Polymerization (NMP), or Atom Transfer Radical Polymerization (ATRP), the incorporation of structural monomers, and/or the concentration.

Cross-linking or branching agents may be used to structure the (co)polymers. They are advantageously chosen, in a non-limiting manner, from methylene-bis-acrylamide (MBA), ethylene glycol diacrylate, tetraallyl ammonium polyethylene glycol chloride, diacrylamide, cyanomethyl acrylate, tetrallyl ammonium chloride (TAAC), triallylamine, epoxies and mixtures thereof.

In general, the (co)polymer is obtained by a polymerization process taking place in the usual manner, i.e., the embodiment of which is known to a person skilled in the art. Indeed, it may be obtained according to all the polymerization techniques well-known to a person skilled in the art. It may, in particular, be a polymerization in solution; gel polymerization; precipitation polymerization; (aqueous or reverse) emulsion polymerization; suspension polymerization; reactive extrusion polymerization; micellar polymerization; UV polymerization; or microwave polymerization.

According to a particular embodiment of the invention, the (co)polymer may undergo a post-hydrolysis reaction. Post-hydrolysis is the reaction of the (co)polymer after its formation by polymerization of monomer(s). This step consists of the reaction of the hydrolysable functional groups of the nonionic monomers, such as the monomers with an amide or ester function, with a base.

The (co)polymer may be in liquid, gel or solid form when its preparation includes a drying step such as spray drying, drum drying, drying by electromagnetic radiation (microwaves or high frequency) or fluidized bed drying.

The (co)polymer may have a molar mass advantageously between 10,000 daltons and 30 million daltons.

The (co)polymer may be a flocculant, a dispersant, a thickening agent (rheology modifier), an absorbing agent (for example, a super-absorbent of the SAP type which swells in the presence of water), a friction reducing agent, a water and mineral filler retaining agent, or a foam generator and stabilizer.

The (co)polymer preferably contains at least 1 mol % of sulfobetaine monomer of formula (V), preferably at least 5 mol %, more preferably at least 10 mol %, even more preferably at least 20 mol %, even more preferably at least 30 mol %, even more preferably at least 50 mol %.

According to a particular embodiment of the invention, the (co)polymer is a copolymer of sulfobetaine monomer of formula (V) and/or its acid form, and of nonionic monomer. In this case, the copolymer preferably contains from 10 to 90 mol % of sulfobetaine monomers of formula (V) and/or its acid form, and from 10 to 90 mol % of nonionic monomer, more preferably from 30 to 90 mol % of sulfobetaine monomers of formula (V) and/or its acid form, and from 10 to 70 mol % of nonionic monomer, even more preferably from 50 to 90 mol % of sulfobetaine monomers of formula (V) and/or its acid form, and 10 to 50 mol % nonionic monomer.

According to a particular embodiment of the invention, the (co)polymer is a copolymer of sulfobetaine monomer of formula (V) and/or its acid form, and of anionic monomer. In this case, the copolymer preferably contains from 5 to 95 mol % of sulfobetaine monomers of formula (V) and/or its acid form, and from 5 to 95 mol % of anionic monomer, more preferably from 5 to 70 mol % of monomers sulfobetaine of formula (V) and/or its acid form, and from 30 to 95 mol % of anionic monomer, even more preferably from 5 to 50 mol % of sulfobetaine monomers of formula (V) and/or its acid form, and of 50 to 95 mol % anionic monomer.

According to a particular embodiment of the invention, the (co)polymer is a copolymer of sulfobetaine monomer of formula (V) and/or its acid form, and of cationic monomer. In this case, the copolymer preferably contains from 5 to 95 mol % of sulfobetaine monomers of formula (V) and/or its acid form, and from 5 to 95 mol % of cationic monomer, more preferably from 5 to 70 mol % of monomers sulfobetaine of formula (V) and/or its acid form, and from 30 to 95 mol % of cationic monomer, even more preferably from 5 to 50 mol % of sulfobetaine monomers of formula (V) and/or its acid form, and of 50 to 95 mol % cationic monomer.

Use of the (Co)Polymer of the Sulfobetaine Monomer of Formula (V) and/or its Acid Form The invention also relates to the use of the (co)polymer obtained from the sulfobetaine monomer of formula (V) and/or its acid form, as a flocculant, dispersant, thickening agent (rheology modifier), absorbing agent (for example, a super-absorbent of the SAP type which swells in the presence of water), friction reducing agent, water and mineral filler retaining agent, or foam generator and stabilizer.

The invention also relates to the use of the (co)polymers obtained from the sulfobetaine monomer of formula (V) and/or its acid form, in oil and gas recovery, water treatment, sludge treatment, in improving aqueous fluid transport in pulp processing, in papermaking, construction, mining, cosmetics formulation, detergent formulation, textile manufacturing, agriculture, or medical hydrogels manufacturing.

Finally, the invention also relates to compositions for hygiene products, cosmetic compositions, shampoo compositions, or pharmaceutical compositions containing a (co)polymer comprising at least the sulfobetaine monomer of formula (V) and/or its acid form, as well as the process of manufacturing said compositions.

The (co)polymers obtained from the sulfobetaine monomer of formula (V) and/or its acid form may be used in all subterranean formation treatments for enhanced oil or gas recovery. They may be used to increase the viscosity of an aqueous injection fluid and/or reduce the level of frictional resistance that occurs when injecting said fluid into a subterranean formation, and/or to maintain particles in suspension in an injection fluid.

These subterranean treatments include, but are not limited to, well-drilling operations, stimulation treatments such as fracturing operations, completion operations, polymer solution sweep enhanced oil recovery processes, conformity operations, operations to reduce the permeability of subterranean formations, or divert part of the subterranean formation.

These (co)polymers are particularly useful in fracturing operations and in polymer solution sweep enhanced oil recovery processes.

The present invention also relates to a fracturing process comprising:
  a. Preparing a fracturing fluid from (co)polymer comprising at least the sulfobetaine monomer of formula (V) and/or its acid form, said (co)polymer preferably being in the form of an inverse emulsion;
  b. Optionally and preferably introducing at least one propping agent into the fracturing fluid;
  c. Introducing the fracturing fluid into part of the subterranean formation;
  d. Fracturing the subterranean formation with the injection fluid;
  e. Recovering a mixture of gas, oil and aqueous fluid.

Therefore, the fracturing fluid treated in step c) either comes from step a) in the case where there is no step b), or comes from step b) in the case where there is a step b). The fracturing process is carried out according to processes known to a person skilled in the art. In particular, the fracturing fluid may contain all the additives and chemical compounds known to a person skilled in the art.

The present invention also relates to a polymer solution sweep enhanced oil recovery process comprising:
a. Preparing an injection fluid from (co)polymer comprising at least the sulfobetaine monomer of formula (V) and/or its acid form, said (co)polymer preferably being in the form of an inverse emulsion or powder;
b. Introducing the injection fluid into part of the subterranean formation;
c. Sweeping the subterranean formation with the injection fluid;
d. Recovering a mixture of gas, oil and aqueous fluid.

The enhanced oil recovery process is carried out according to processes known to a person skilled in the art. In particular, the injection fluid may contain all the additives and chemical compounds known to a person skilled in the art.

The present invention also relates to a process for treating water (dirty and waste waters, etc.) with a (co)polymer comprising at least the sulfobetaine monomer of formula (V) and/or its acid form. Waste water is "polluted water", made up of all water likely to contaminate, by physical, chemical or biological pollutants, the environments into which it is discharged. A distinction is generally made between domestic waste water, industrial waste water, agricultural waste water and rainwater and runoff. The treatment process is preferably a process for treating domestic waste water or for treating industrial waste water.

The present invention also relates to a process for treating sludge with a (co)polymer comprising at least the sulfobetaine monomer of formula (V) and/or its acid form. This includes, but is not limited to, sludge from water treatment, tailings from the mining industry, tailings from the coal industry, tailings from oil sands operations, and all tailings containing mineral waste.

The present invention also relates to a process for improving the transport of aqueous fluid with a (co)polymer comprising at least the sulfobetaine monomer of formula (V) and/or its acid form.

This concerns, but is not limited to, the transport of water in pipes, the transport of aqueous suspension of solid particles, such as mineral waste, and the transport of sludge in pipes.

The present invention also relates to a process for treating paper pulp with a (co)polymer comprising at least the sulfobetaine monomer of formula (V) and/or its acid form.

The present invention also relates to a process for manufacturing paper, typically paper or cardboard sheets with a (co)polymer comprising at least one of the sulfobetaine monomer of formula (V) and/or its acid form. In this case, the (co)polymers of the invention are generally used as a retention agent, a dry strength agent or a wet strength agent.

The present invention also relates to compositions for hygiene products, cosmetic compositions, shampoo compositions, or pharmaceutical compositions containing a (co)polymer comprising at least the sulfobetaine monomer of formula (V) and/or its acid form, as well as the process of making said compositions.

In the examples below, the NMR analyzes were carried out on a Bruker 400 MHz ASCEND™ Avance III HD-type device equipped with a 10 mm BBO 400 MHz Z-Gradient probe.

The IR analyzes were carried out on an infrared measuring equipment by Fourier transform of the Spectrum 100-type from Perkin Elmer, whose precision is 8 cm$^{-1}$. The solids obtained in Examples 1 and 2 were sieved at 100 m. The particles remaining on the sieve were dried and put in an oven at 60° C. for at least 4 hours. 10 mg of solid was precisely weighed and mixed with 500 mg of potassium bromide (KBr). The mixture was then compacted in a hydraulic press under a pressure of at least 10 bar.

The X-ray diffraction analyzes were carried out with a Rigaku MiniFlex II-type diffractometer equipped with a copper source. The solids obtained following the reactions were ground beforehand to form powders and were analyzed by X-ray diffraction over an angular range of 10 to 90°.

In this application, the following abbreviations are used:
ADAME: 2-(dimethylaminoethyl) acrylate
MADAIE: 2-(dimethylaminoethyl) methacrylate
MAAMPS: 2-(3-((2-(methacryloyloxy)ethyl)dimethylammonio)propanamido)-2-methylpropane-1-sulfonate
AAMPS: 2-(3-((2-(acryloyloxy)ethyl)dimethylammonio)propanamido)-2-methylpropane-1-sulfonate
ALMPS: 2-(3-(allyldimethylammonio)propanamido)-2-methylpropane-1-sulfonate
DAMPS: 2-(3-(diallylmethylammonio)propanamido)-2-methylpropane-1-sulfonate
AMMPS: 2-(3-((2-acrylamidopropyl)dimethylammonio)propanamido)-2-methylpropane-1-sulfonate
MAMMPS: 2-(3-((2-methacrylamidopropyl)dimethylammonio)propanamido)-2-methylpropane-1-sulfonate
DMAPS: [2-(Methacryloyloxy)-ethyl]-dimethyl-(3-sulfopropyl)-ammonium hydroxide
MBA: N'-methylene bisacrylamide
EGDMA: Ethylene glycol dimethacrylate
AA: Acrylic acid
AM: Acrylamide
ADC: 2-dimethylamino ethyl acrylate methyl chloride, otherwise known as trimethyl(2-prop-2-enoyloxyethyl) azanium chloride
AIBN: Azobisisobutyronitrile
HLB: Hydrophilic Lipophilic Balance
DLS: Dynamic Light Scattering
Dh: Hydrodynamic diameter
FPR=Total retention (fibers+mineral fillers)
FPAR=Mineral filler retention
DDA: Vacuum drainage
HVFR: High Viscosity Friction Reducer
GPT: Gallon Per Thousand (Gallon per thousand, i.e., 1 lb/1000 US gallons=120 ppm in mass)
D: Darcy The present invention and the resulting advantages will emerge better from the following Figs. and examples given in order to illustrate the invention, and not in a limiting manner.

EXAMPLES

In the examples, the amounts expressed in ppm are by mass, relative to the total mass of the monomers. This may, in particular, be the case with the amount of crosslinker.

Alternatively, unless otherwise indicated, the bulk viscosity is measured using a Brookfield viscometer, at a 12-rpm rotational speed at 25° C., at 1 mg/L in an aqueous solution containing 0.3 mol/L of NaCl.

Example 1: Process for Preparing AAMPS 230 g of dimethyl aminoethyl acrylate (ADAME) and 50 g of water are charged in a 1000 mL glass reactor equipped with a stirrer and a condenser, The temperature of the mixture is maintained at 20° C. 410 g of acetone are added to the medium as a solvent. 164 g of 2-acrylamido-2-methylpropane sulfonic acid are added to the previous mixture. The temperature is maintained at 20° C. and stirring is maintained at a speed of 300 rpm. The reaction takes place at atmospheric pressure. After 72 hours, the formation of product crystals forms a suspension in the reaction medium. The crystals are separated by Buchner-type vacuum filtration, the crystals are then washed directly in the filter with ethanol. The crystals thus obtained are placed in an oven at 40° C. under vacuum for 4 hours. 40.5 g of crystals are obtained; the yield is 15%, and the purity 90%.

Figure 1:
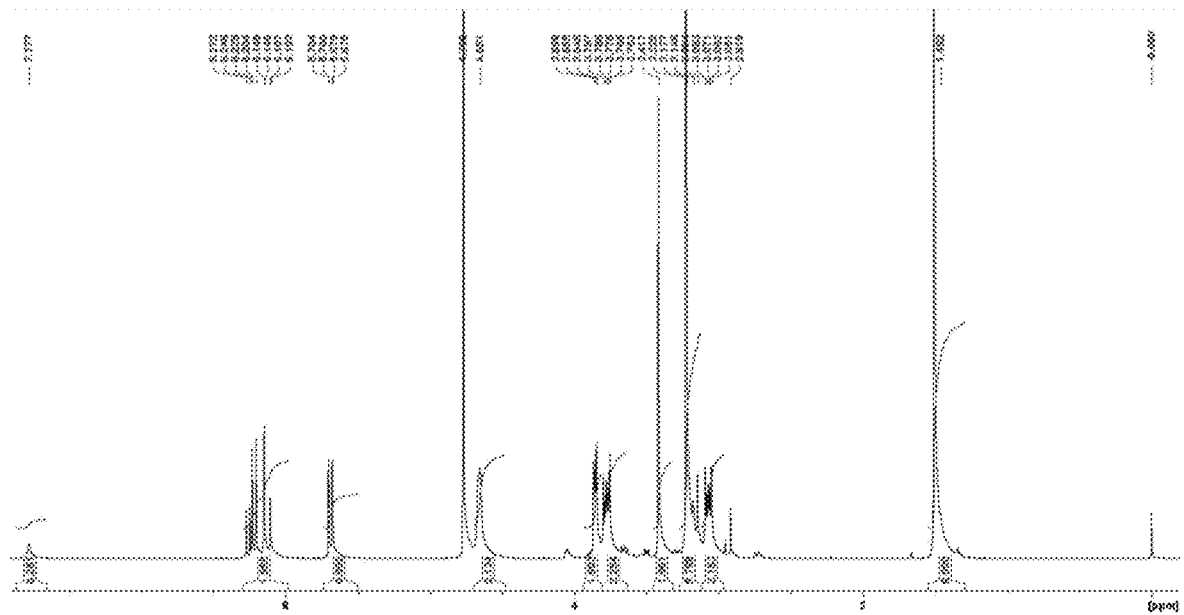
FIG. 1 illustrates the proton NMR spectrum of the AAMPS monomer.
Figure 9:
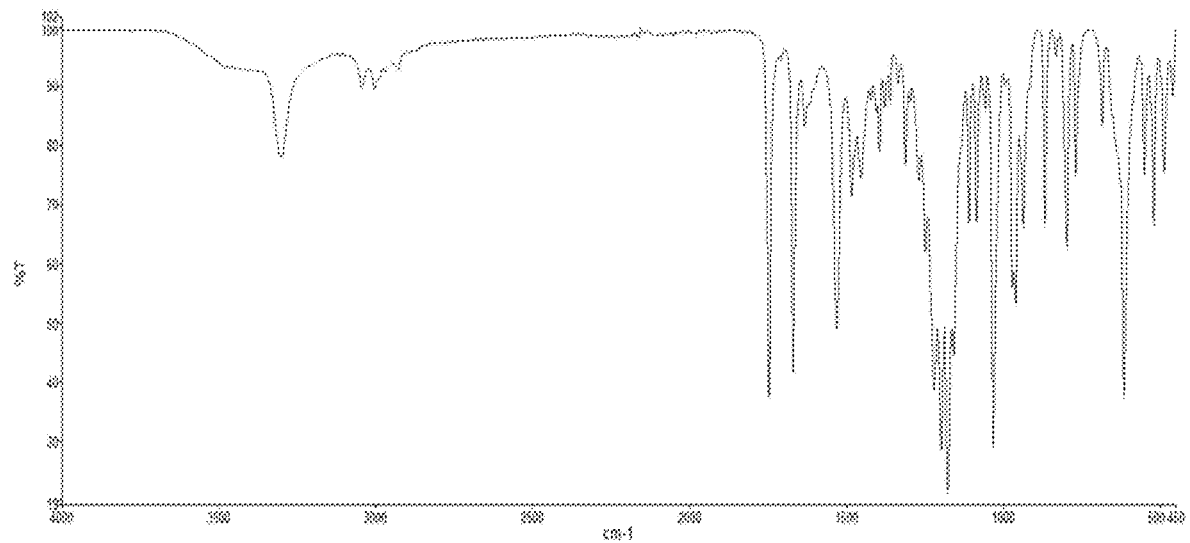
FIG. 9 illustrates the IR spectrum of the AAMPS monomer.

An NMR analysis is carried out on the crystals obtained, and the structure of formula (IX) of the AAMPS monomer is confirmed as demonstrated by the proton NMR spectrum in FIG. 1. FIG. 9 illustrates the IR spectrum of the AAMPS monomer.

Example 2: Process for Preparing MAMMPS 410 g of dimethylaminopropyl methacrylamide (DMAPMA) and 50 g of water are charged in a 1000 mL glass reactor equipped with a stirrer and a condenser. The temperature of the mixture is maintained at 20° C. 164 g of 2-acrylamido-2-methylpropane sulfonic acid are added to the previous mixture. The contact time is 200 hours, the temperature is maintained at 20° C. and the stirring is maintained at a speed of 300 rpm. The reaction takes place at atmospheric pressure.

Crystals precipitate and a suspension of these crystals is obtained in the reaction mixture. The crystals are separated by Buchner-type vacuum filtration and washed with acetone. The crystals are then placed in an oven at 40° C. under vacuum for 6 hours. 273 g of crystals are obtained, and the yield is 92% with a product purity of 90%.

Figure 2:
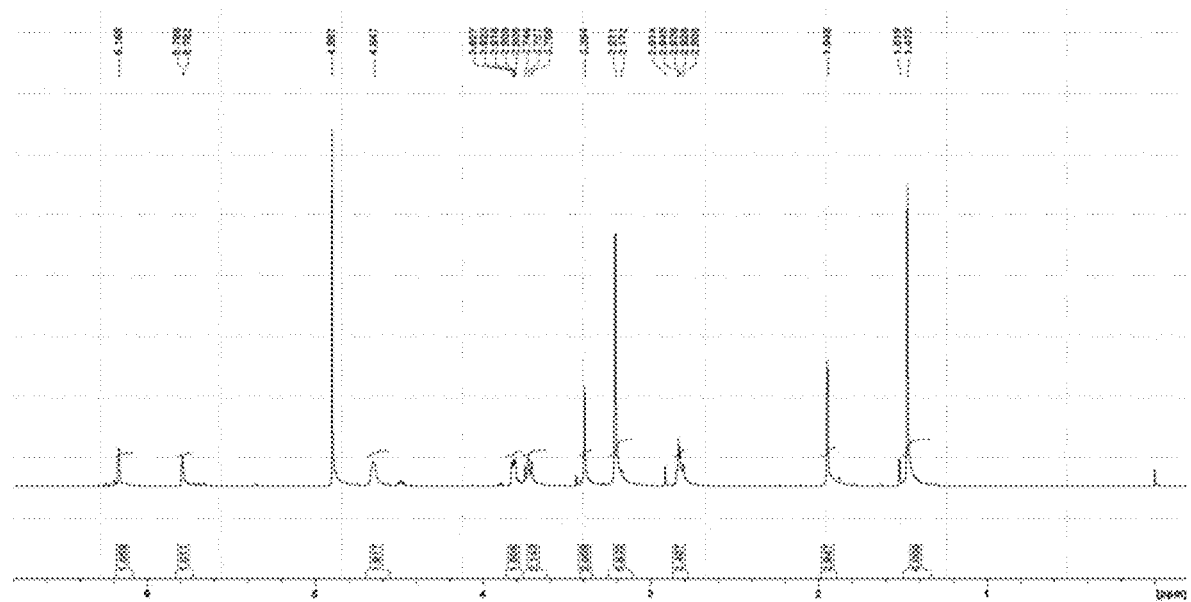
FIG. 2 illustrates the proton NMR spectrum of MAMMPS monomer.
Figure 10:
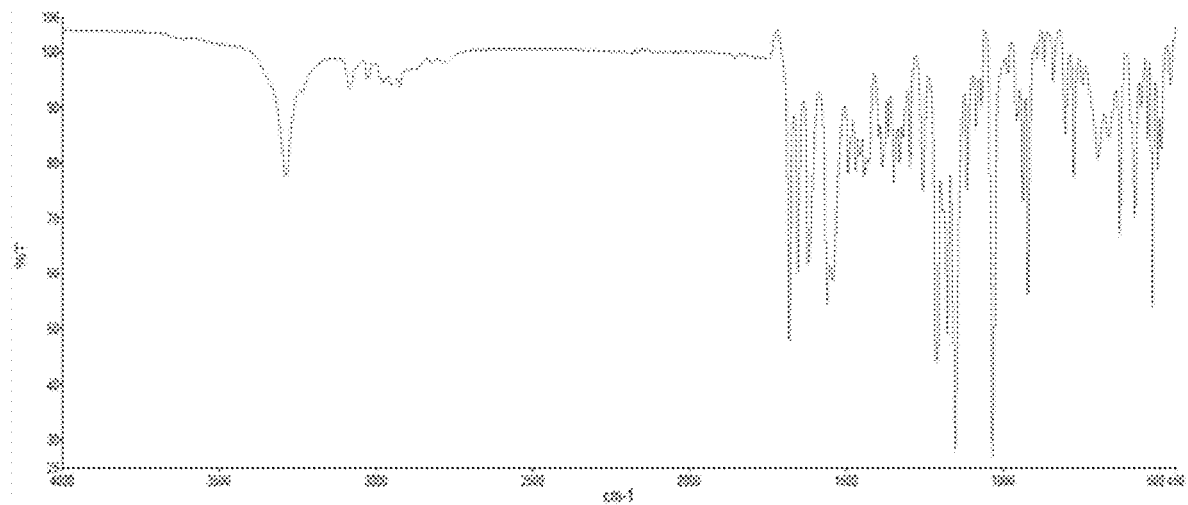
FIG. 10 illustrates the IR spectrum of MAMMPS monomer.

An NMR analysis is carried out on the crystals obtained, and the structure of formula (IX) of the MAMMPS monomer is confirmed, as demonstrated by the proton NMR spectrum in FIG. 2 and the IR spectrum in FIG. 10.

Example 3: Process for Preparing MAMMPS 410 g of dimethylaminopropyl methacrylamide (DMAPMA) and 3 g of water are charged in a 1000 mL glass reactor equipped with a stirrer and a condenser. The temperature of the mixture is maintained at 20° C. 164 g of 2-acrylamido-2-methylpropane sulfonic acid are added to the previous mixture. The contact time is 200 hours, the temperature is maintained at 20° C. and the stirring is maintained at a speed of 300 rpm. The reaction takes place at atmospheric pressure.

Crystals precipitate and a suspension of these crystals is obtained in the reaction mixture. The crystals are separated by Buchner-type vacuum filtration and washed with acetone. The crystals are then placed in an oven at 40° C. under vacuum for 6 hours. 179 g of crystals are obtained. The mass yield is 60% with a product purity of 75%.

Example 4: Process for Preparing MAMMPS 270 g of dimethylaminopropyl methacrylamide (DMAPMA) and 50 g of water are charged in a 1000 mL glass reactor equipped with a stirrer and a condenser. The temperature of the mixture is maintained at 20° C. 164 g of 2-acrylamido-2-methylpropane sulfonic acid are added to the previous mixture. 138 g of acetone are added to the reaction medium. The contact time is 200 hours, the temperature is maintained at 20° C. and the stirring is maintained at a speed of 300 rpm. The reaction takes place at atmospheric pressure.

Crystals precipitate and a suspension of these crystals is obtained in the reaction mixture. The crystals are separated by Buchner-type vacuum filtration and washed with acetone. The crystals are then placed in an oven at 40° C. under vacuum for 6 hours. 218 g of crystals are obtained. The mass yield is 73% with a product purity of 90%.

Example 5: Process for Preparing the AMMPS 444 g of dimethylaminopropylacrylamide (DMAPAA) and 60 g of water are charged in a 1000 mL glass reactor equipped with a stirrer and a condenser. The temperature of the mixture is maintained at 20° C. 197 g of 2-acrylamido-2-methylpropane sulfonic acid are added to the previous mixture. The contact time is 200 hours, the temperature is maintained at 20° C. and the stirring is maintained at a speed of 300 rpm. The reaction takes place at atmospheric pressure.

Crystals precipitate and a suspension of these crystals is obtained in the reaction mixture. The crystals are separated by Buchner-type vacuum filtration and washed with acetone. The crystals are then placed in an oven at 40° C. under vacuum for 6 hours. 363 g of crystals are obtained. The mass yield is 25% with a product purity of 45%.

Figure 3:
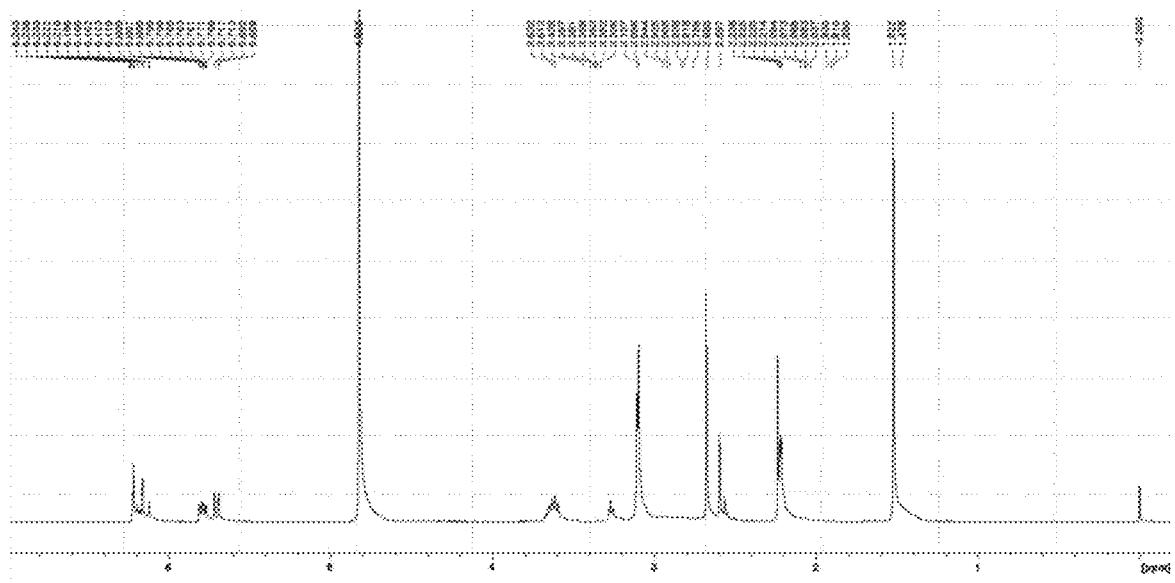
FIG. 3 illustrates the proton NMR spectrum of the AMMPS monomer.
Figure 11:
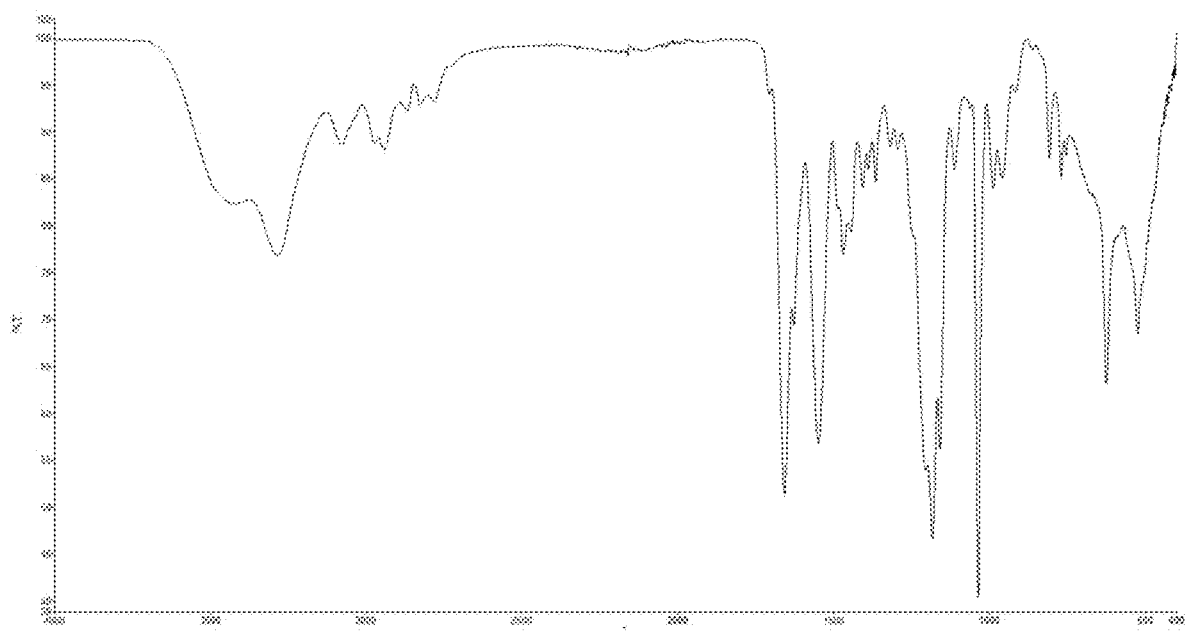
FIG. 11 illustrates the IR spectrum of AMMPS monomer.

An analysis is performed on the crystals obtained, and the structure of the AMMPS monomer is confirmed, as demonstrated by the proton NMR spectrum in FIG. 3 and the IR spectrum in FIG. 11.

Example 6: Process for Preparing MAAMPS 563 g of dimethyl aminoethyl methacrylate (MADAME) and 38 g of water are charged in a 1000 mL glass reactor equipped with a stirrer and a condenser. The temperature of the mixture is maintained at 20° C. 123 g of 2-acrylamido-2-methylpropane sulfonic acid are added to the previous mixture. The contact time is 170 hours, the temperature is maintained at 20° C. and the stirring is maintained at a speed of 300 rpm. The reaction takes place at atmospheric pressure.

Crystals precipitate and a suspension of these crystals is obtained in the reaction mixture. The crystals are separated by Buchner-type vacuum filtration and washed with acetone. The crystals are then placed in an oven at 40° C. under vacuum for 6 hours. 143 g of crystals are obtained. The yield is 66%, the purity of the product being 90%.

Figure 4:
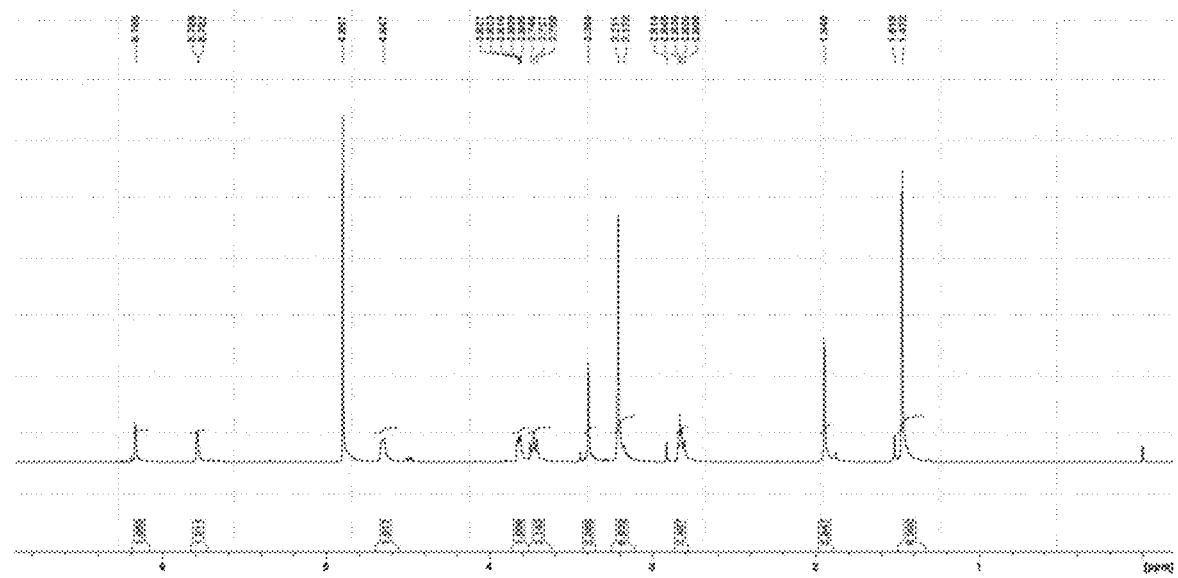
FIG. 4 illustrates the proton NMR spectrum of MAAMPS monomer.
Figure 12:
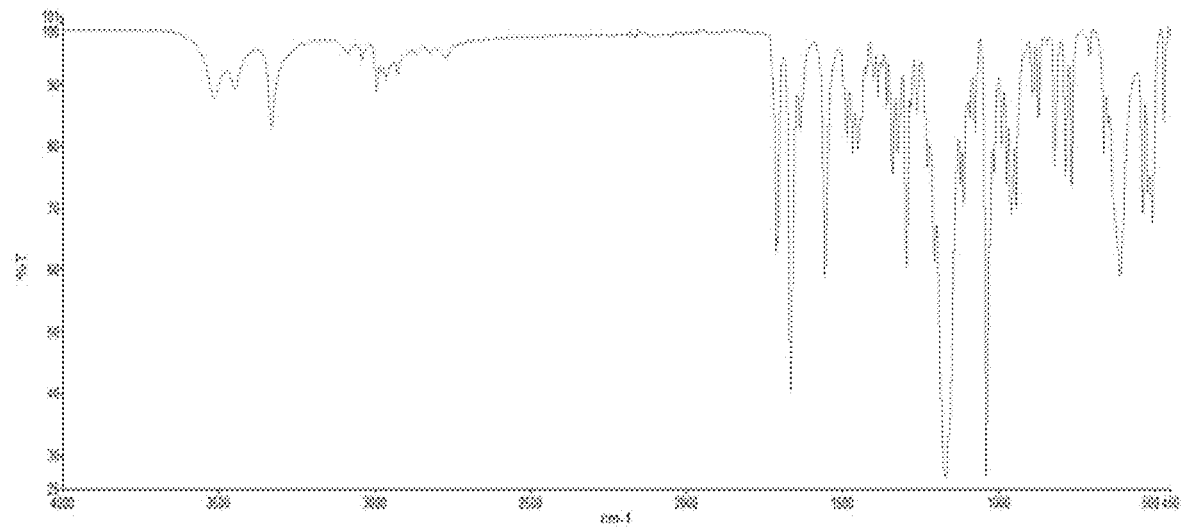
FIG. 12 illustrates the IR spectrum of MAAMPS monomer.

An NMR analysis is carried out on the crystals obtained, and the structure of formula (VIII) of the MAAMPS monomer is confirmed, as demonstrated by the proton NMR spectrum in FIG. 4 and the IR spectrum in FIG. 12.

Example 7: Process for Preparing MAAMPS 400 g of dimethyl aminoethyl methacrylate (MADAME) and 247 g of water are charged in a 1000 mL glass reactor equipped with a stirrer and a condenser. The temperature of the mixture is maintained at 20° C. 176 g of 2-acrylamido-2-methylpropane sulfonic acid are added to the previous mixture. The contact time is 170 hours, the temperature is maintained at 20° C. and the stirring is maintained at a speed of 300 rpm. The reaction takes place at atmospheric pressure.

Crystals precipitate and a suspension of these crystals is obtained in the reaction mixture. The crystals are separated by Buchner-type vacuum filtration and washed with acetone. The crystals are then placed in an oven at 40° C. under vacuum for 6 hours. 37 g of crystals are obtained. The yield is 12%, the purity of the product being 90%.

Figure 15:
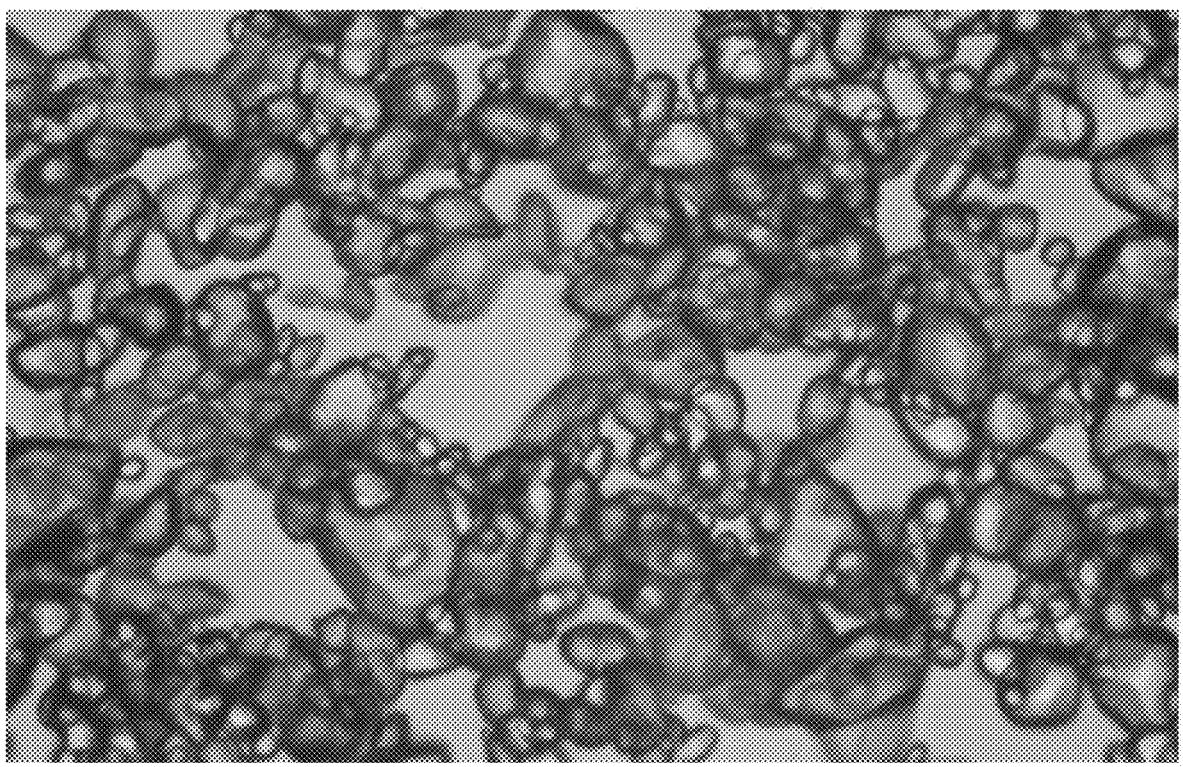
FIG. 15 corresponds to the observation of the crystals of the monomer MAAMPS of Example 7 in hydrated crystalline form under an optical microscope.

A microscope observation illustrated by FIG. 15 shows a particular form of crystals.

Example 8: Process for Preparing MAAMPS 224 g of dimethyl aminoethyl methacrylate (MADAME) and 64 g of water are charged in a 1000 mL glass reactor equipped with a stirrer and a condenser. The temperature of the mixture is maintained at 20° C. 328 g of 2-acrylamido-2-methylpropane sulfonic acid are added to the previous mixture. 163 g of acetone are added to the medium as well as 33 g of potassium carbonate. The contact time is 170 hours, the temperature is maintained at 20° C. and stirring is maintained at a speed of 300 rpm. The reaction takes place at atmospheric pressure.

Crystals precipitate and a suspension of these crystals is obtained in the reaction mixture. The crystals are separated by Buchner-type vacuum filtration and washed with acetone. The crystals are then placed in an oven at 40° C. under vacuum for 6 hours. 288 g of crystals are obtained. The yield is 50%, the purity of the product being 57%.

Example 9: Process for Preparing MAAMPS 380 g of dimethyl aminoethyl methacrylate (MADAME) are charged in a 1000 mL glass reactor equipped with a stirrer and a condenser. The temperature of the mixture is maintained at 20° C. 167 g of 2-acrylamido-2-methylpropane sulfonic acid are added to the previous mixture. 190 g of acetone are added in the medium as well. The contact time is 200 hours, the temperature is maintained at 20° C. and the stirring is maintained at a speed of 300 rpm. The reaction takes place at atmospheric pressure.

Crystals precipitate and a suspension of these crystals is obtained in the reaction mixture. The crystals are separated by Buchner-type vacuum filtration and washed with acetone. The crystals are then placed in an oven at 40° C. under vacuum for 6 hours. 29 g of crystals are obtained. The yield is 10%, the purity of the product being 60%.

Example 10: Process for Preparing MAAMPS 226 g of dimethyl aminoethyl methacrylate (MADAME) are charged in a 1000 mL glass reactor equipped with a stirrer and a condenser. The temperature of the mixture is maintained at 20° C. 600 g of an aqueous solution of 50% sodium 2-acrylamido-2-methylpropane sulfonate are added to the previous mixture. The contact time is 170 hours, the temperature is maintained at 20° C. and the stirring is maintained at a speed of 300 rpm. The reaction takes place at atmospheric pressure.

The product obtained is dissolved in the reaction medium. The yield is 39%, the purity of the product being 35%.

Figure 16:
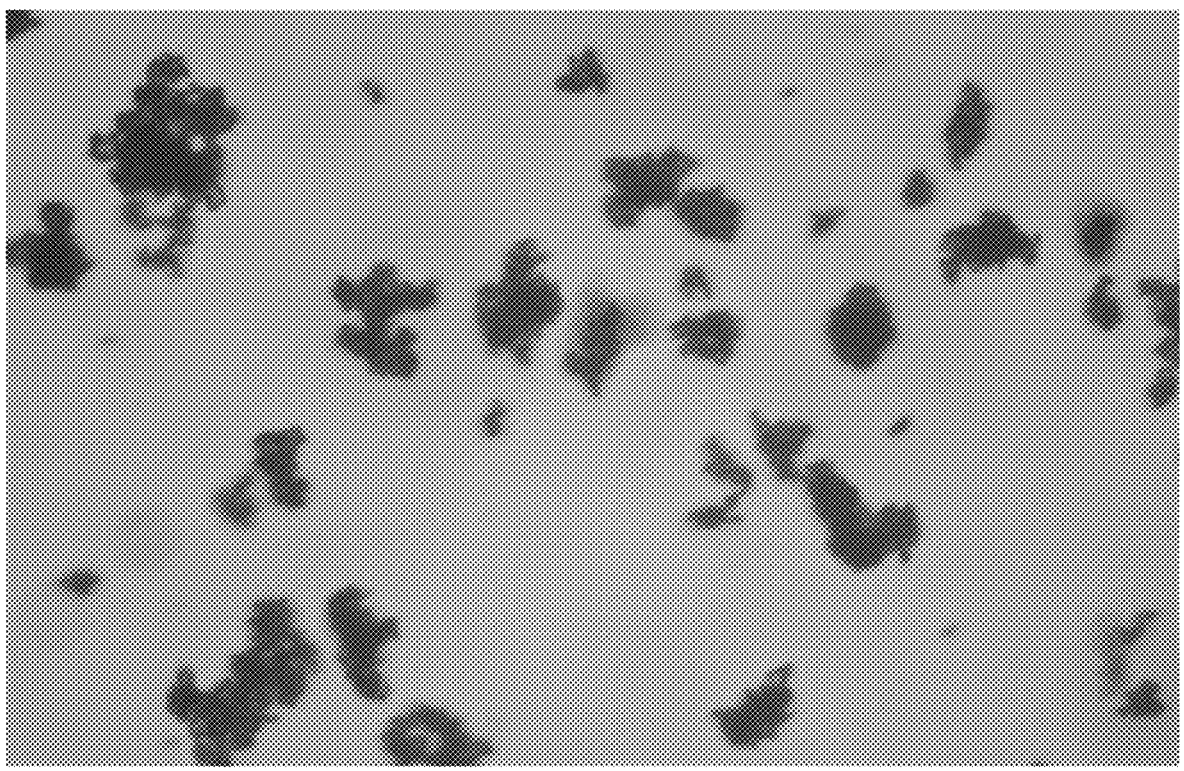
FIG. 16 corresponds to the observation of the crystals of the MAAMPS monomer of Example 10 in anhydrous crystalline form under an optical microscope.

A microscope observation illustrated by FIG. 16 shows a particular form of crystals different from those obtained in Example 7 and FIG. 15.

Example 11: Process for Preparing the ALMPS 303 g of allyl dimethylamine (ADMA) are charged in a 1000 mL glass reactor equipped with a stirrer and a condenser. The temperature of the mixture is maintained at 20° C. 246 g of 2-acrylamido-2-methylpropane sulfonic acid are added to the previous mixture as well as 10 g of acetone and 15 g of water. The contact time is 170 hours, the temperature is maintained at 20° C. and the stirring is maintained at a speed of 300 rpm. The reaction takes place at atmospheric pressure.

Crystals precipitate after adding acetone and a suspension of these crystals is obtained in the reaction mixture. The crystals are separated by Buchner-type vacuum filtration and washed with acetone. The crystals are then placed in an oven at 40° C. under vacuum for 6 hours. 273 g of crystals are obtained. The yield is 79%, the purity of the product being 90%.

Figure 5:
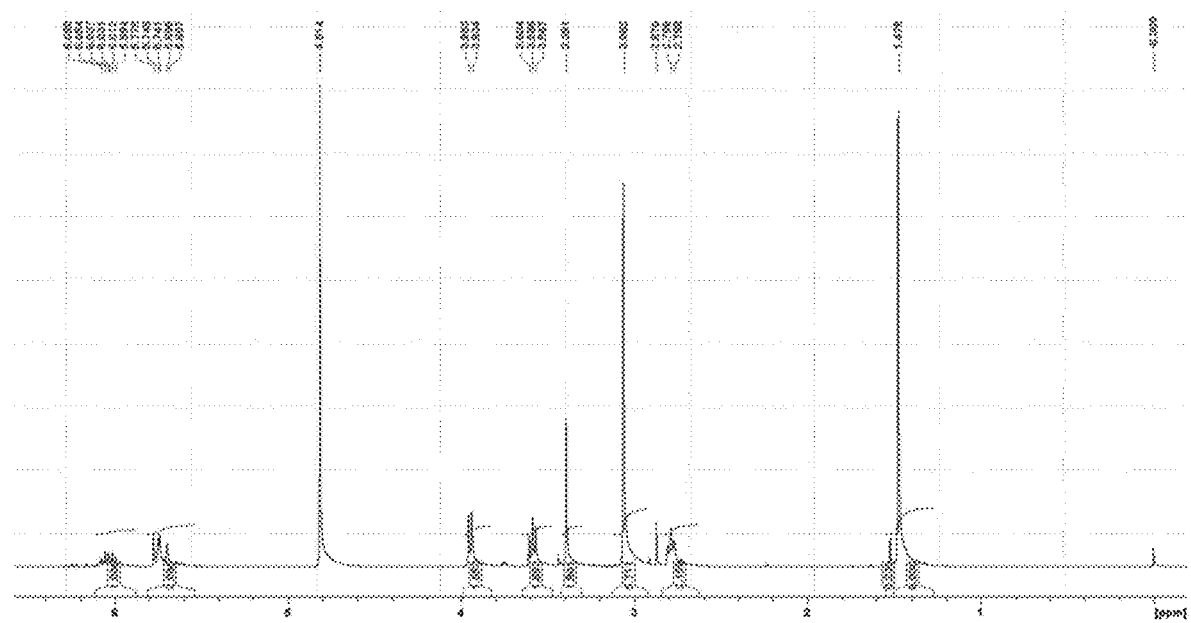
FIG. 5 illustrates the proton NMR spectrum of the ALMPS monomer.
Figure 13:
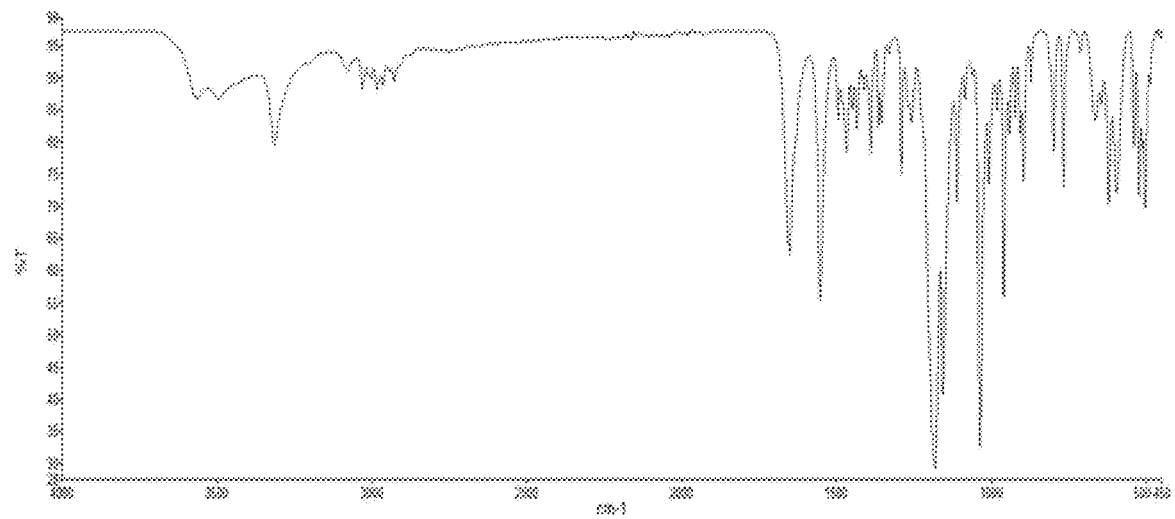
FIG. 13 illustrates the IR spectrum of the ALMPS monomer.

An NMR analysis is carried out on the crystals obtained, and the structure of formula (X) of the ALMPS monomer is confirmed, as demonstrated by the NMR spectrum of the proton in FIG. 5 and the IR spectrum in FIG. 13.

Example 12: Process for Preparing the ALMPS 369 g of allyl dimethylamine (ADMA) are charged in a 1000 mL glass reactor equipped with a stirrer and a condenser. The temperature of the mixture is maintained at 20° C. 300 g of 2-acrylamido-2-methylpropane sulfonic acid are added to the previous mixture as well as 175 g of acetone. The contact time is 170 hours, the temperature is maintained at 20° C. and the stirring is maintained at a speed of 300 rpm. The reaction takes place at atmospheric pressure.

Crystals precipitate after adding acetone to the medium and a suspension of these crystals is obtained in the reaction mixture. The crystals are separated by Buchner type vacuum filtration and washed with acetone. The crystals are then placed in an oven at 40° C. under vacuum for 6 hours. 222 g of crystals are obtained. The yield is 52%, the purity of the product being 90%.

Example 13: Process for Preparing the ALMPS 177 g of allyl dimethylamine (ADMA) are charged in a 1000 mL glass reactor equipped with a stirrer and a condenser. The temperature of the mixture is maintained at 20° C. 144 g of 2-acrylamido-2-methylpropane sulfonic acid are added to the previous mixture as well as 180 g of acetone and 336 g of water. The contact time is 170 hours, the temperature is maintained at 20° C. and the stirring is maintained at a speed of 300 rpm. The reaction takes place at atmospheric pressure.

Crystals precipitate after adding acetone to the medium and a suspension of these crystals is obtained in the reaction mixture. The crystals are separated by Buchner type vacuum filtration and washed with acetone. The crystals are then placed in an oven at 40° C. under vacuum for 6 hours. 106 g of crystals are obtained. The yield is 52%, the purity of the product being 90%.

Example 14: Process for Preparing DAMPS 120 g of diallylmethylamine (DAMA) are charged in a 1000 mL glass reactor equipped with a stirrer and a condenser. The temperature of the mixture is maintained at 20° C. 112 g of 2-acrylamido-2-methylpropane sulfonic acid are added to the previous mixture as well as 75 g of acetone and 30 g of water. The contact time is 170 hours, the temperature is maintained at 20° C. and the stirring is maintained at a speed of 300 rpm. The reaction takes place at atmospheric pressure.

Crystals precipitate after adding acetone to the medium and a suspension of these crystals is obtained in the reaction mixture. The crystals are separated by Buchner-type vacuum filtration and washed with acetone. The crystals are then placed in an oven at 40° C. under vacuum for 6 hours. 135 g of crystals are obtained. The yield is 85%, the purity of the product being 90%.

Figure 6:
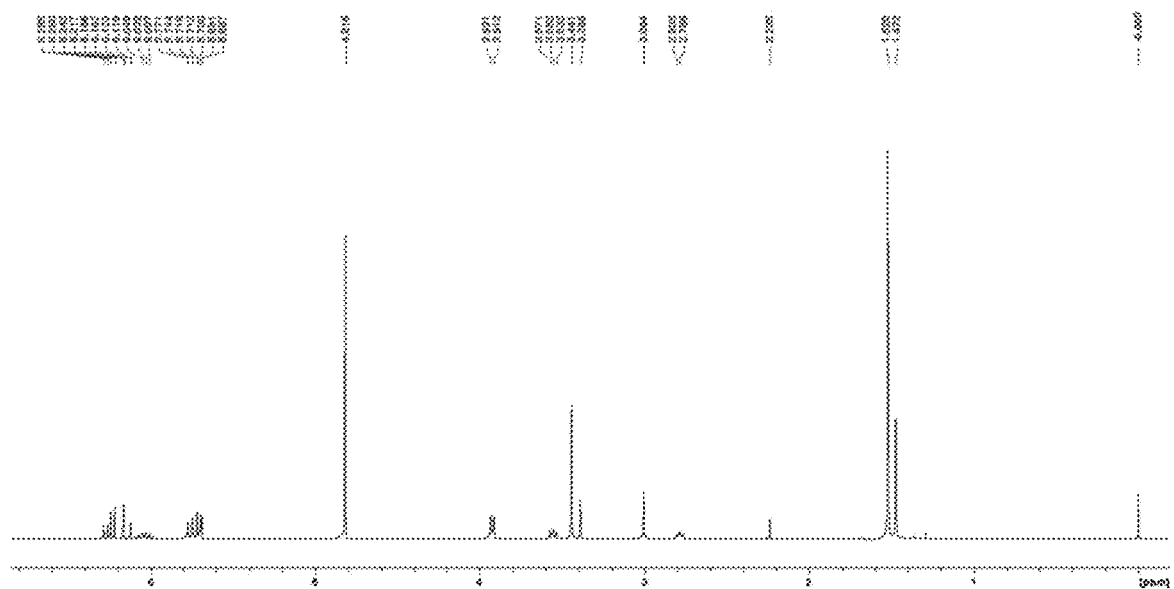
FIG. 6 illustrates the proton NMR spectrum of the DAMPS monomer.
Figure 14:
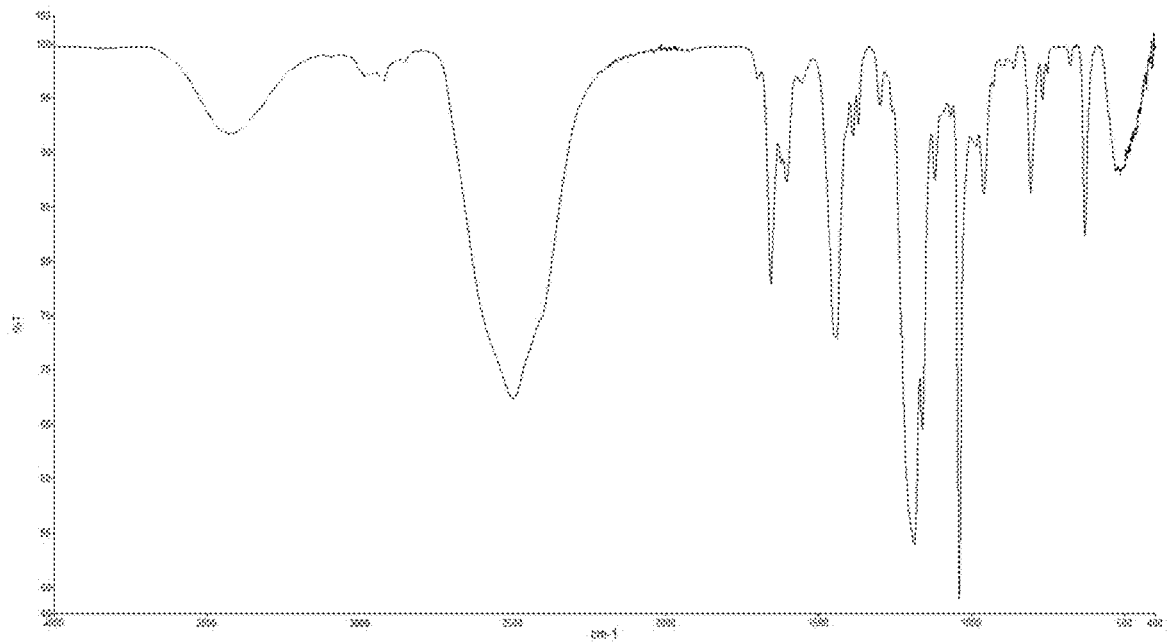
FIG. 14 illustrates the IR spectrum of DAMPS monomer.

An NMR analysis is carried out on the crystals obtained, and the structure of formula (X) of the DAMPS monomer is confirmed, as demonstrated by the proton NMR spectrum in FIG. 6 and the IR spectrum in FIG. 14

Example 15: Process for Preparing DAMPS 120 g of diallylmethylamine (DAMA) are charged in a 1000 mL glass reactor equipped with a stirrer and a condenser. The temperature of the mixture is maintained at 20° C. 112 g of 2-acrylamido-2-methylpropane sulfonic acid are added to the previous mixture as well as 75 g of acetone and 7.5 g of water. The contact time is 170 hours, the temperature is maintained at 20° C. and the stirring is maintained at a speed of 300 rpm. The reaction takes place at atmospheric pressure.

Crystals precipitate after adding acetone to the medium and a suspension of these crystals is obtained in the reaction mixture. The crystals are separated by Buchner-type vacuum filtration and washed with acetone. The crystals are then placed in an oven at 40° C. under vacuum for 6 hours. 135 g of crystals are obtained. The yield is 85%, the purity of the product being 90%.

Example 16: Analysis by X-Ray Diffraction

The solids obtained in Examples 7 and 10 are ground beforehand to form powders and are analyzed by X-ray diffraction over an angular range of 10 to 90°. The equipment used is a Rigaku MiniFlex II diffractometer equipped with a copper source.

Figure 7:
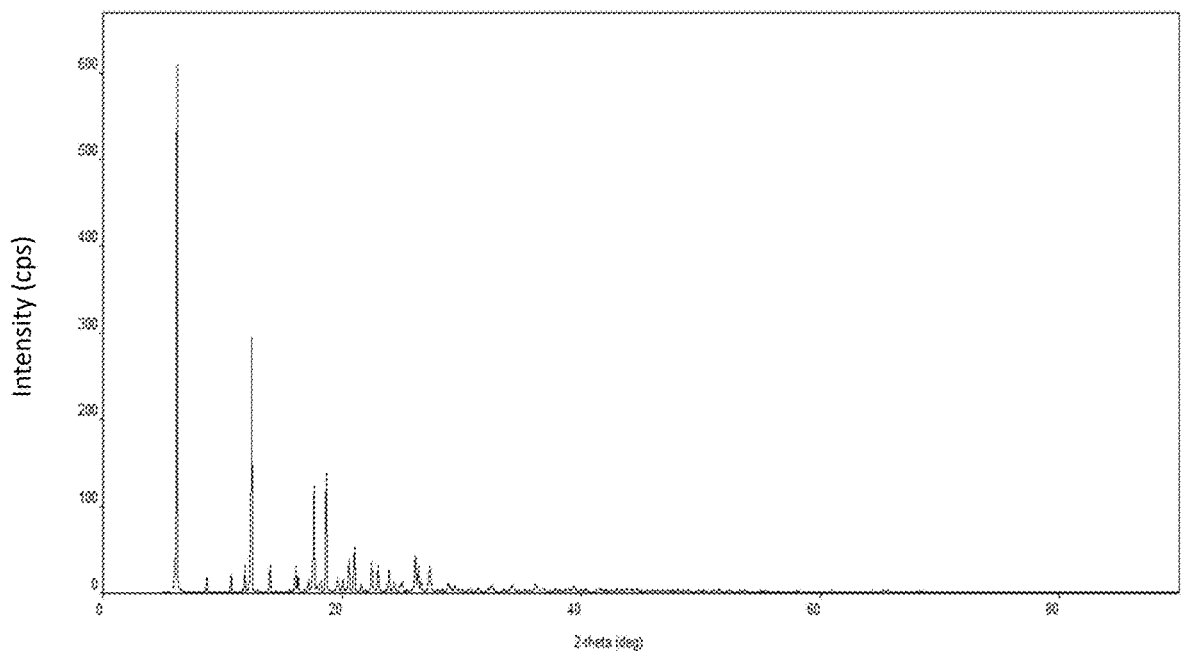
FIG. 7 illustrates the X-ray diffraction pattern of the MAAMPS monomer crystals in the hydrated crystalline form of Example 7.

It is possible to see that the solid obtained at the end of Example 7 (FIG. 7) has an X-ray diffraction diagram with the following characteristic peaks:
  6.19°, 7.66°, 8.70°, 10.20°, 10.73°, 11.85°, 12.38°, 13.98°, 15.39°, 16.11°, 16.76°, 17.23°, 17.72°, 18.23°, 18.66°, 19.24°, 19.63°, 20.06°, 20.53°, 21.02°, 21.65°, 22.31°, 23.00°, 24.02°, 25.17°, 26.110, 26.36°, 27.36°, 28.07°, 29.08°, 29.48, 29.91° 2-theta degrees. The uncertainty is generally of the order of +/−0.05°.

Figure 8:
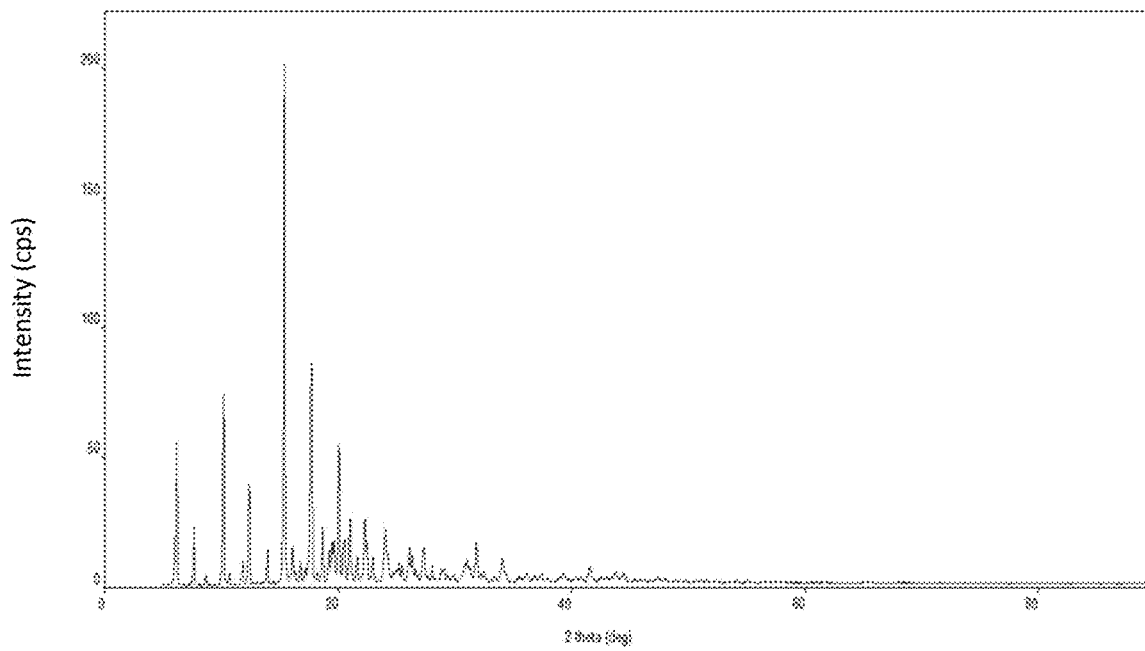
FIG. 8 illustrates the X-ray diffraction pattern of MAAMPS monomer crystals in the anhydrous crystalline form of Example 10.

It is possible to see that the solid obtained at the end of Example 10 (FIG. 8) has an X-ray diffraction diagram with the following characteristic peaks:
  6.23°, 8.74°, 10.75°, 11.91°, 12.45°, 12.51°, 14.02°, 14.49°, 15.7°, 16.13°, 16.33°, 17.21°, 17.66°, 18.26°, 18.68°, 19.63°, 20.08°, 20.57°, 21.04°, 21.59°, 22.47°, 23.00°, 23.92°, 24.37°, 24.86°, 25.01°, 25.62°, 26.13°, 26.38°, 26.62°, 27.34°, 28.93°, 29.40° 2-theta degrees (+/−0.05°).

It is thus possible to highlight a difference in crystalline structure for the same MAAMPS molecule, a sign of a polymorphism.

Additional Examples: Process for Preparing MAAMPS with a Decreasing Amount of MEHQ (Mono Methyl Ether of Hydroquinone) as a Polymerization Inhibitor Example 9 is reproduced by adding 1000 ppm, 750 ppm, 500 ppm, 450 ppm, 250 ppm, and 50 ppm (relative to the amount of MADAME and 2-acrylamido-2-methylpropane sulfonic acid) of MEHQ in 190 g of acetone.

When 1000 ppm of MEHQ are added, the yield is 5% and the purity 42%.

When 750 ppm of MEHQ are added, the yield is 6% and the purity 45%.

When 500 ppm of MEHQ are added, the yield is 8% and the purity 51%.

The addition of polymerization inhibitor in large amounts, i.e., 750 ppm and 1000 ppm, leads to a drop in yield and purity. It is surprising to note that by using a reduced amount of MEHQ, i.e., less than 500 ppm, in particular 450 ppm, 250 ppm, or more preferably 50 ppm or less, the yield and the purity are improved compared to the tests carried out in the presence of 500 ppm or more of MEHQ.

Example 17: Preparation of Inverse Emulsion of Polymers Based on Sulfobetaine and their Use in Conformance The following series of examples deals with the preparation of polymer microparticles based on the sulfobetaines of the invention. These particles should show an increase in size, Dh (swelling/aggregation), as a function of temperature. Thus, these particles may be used as conformance additives for enhanced oil recovery (EOR) and make it possible:
- to reduce the permeability in areas of high temperatures and high permeability in order to increase the crude displacement efficiency of a water or chemical injection; and
- to reduce or totally block the production of water, at the production wells.

Synthesis Procedure:

Cross-linked polymer particles of 2-(diethylamino)ethyl methacrylate and a polymerizable sulfobetaine were prepared by conventional free radical inverse emulsion polymerization. The procedure consists in:
  Preparing the organic phase: in a first reactor are introduced with stirring:
    a mineral oil containing saturated hydrocarbons
    surfactants of the sorbitan ester-type with an HLB of 3 to 7
  Preparing the aqueous phase: in a second reactor are introduced with stirring and at room temperature:
    Deionized water
    zwitterionic monomers of the sulfobetaine type according to the invention or zwitterionic monomers described in the prior art
    comonomers: DEAEMA and crosslinker (on diacrylamido base and/or dimethacrylate)
    pH modifiers
  After obtaining a homogeneous organic phase, the aqueous phase is emulsified for a few tens of seconds in the organic phase under sustained mechanical and shearing agitation. A stable emulsion is obtained.
  The emulsion is transferred to a jacketed reactor fitted with a stirring system and then degassed via bubbling with nitrogen for 60 minutes.
  Polymerization may be initiated with a redox couple.
  After cooling of the reaction medium, the inverting surfactant having an HLB of 12 is introduced with gentle stirring.

Characterization of the Hydrodynamic Diameter (Dh) of Polymer Particles by Dynamic Light Scattering (DLS)

The sizes of the polymer particles (Dh) at ambient temperature and their evolution with temperature were characterized by DLS using the ZETASIZER NANO ZS marketed by Malvern and equipped with a 4 mW-632.8 nm Helium Neon laser. The polymer particles were analyzed at a concentration of 1 mg/mL in brine (0.3 mol/L NaCl). The cuvettes used are made of quartz. Data is analyzed using Malvern DTS software. In the context of temperature rises, data is collected at 5° C. temperature intervals with a sample equilibrium time of 5 minutes.

Before they can be used as conformance additives in many fields:
  It is preferable that the Dh values of the polymer populations increase as quickly as possible, and ideally at temperatures between 3° and 50° C.
  The aggregates of particles formed with the increase in temperature are advantageously characterized by the highest possible Dh values.

Characterization of the Reversibility Properties of Polymer Particles

The reversibility properties of the particles will be evaluated by studying the variation of the hydrodynamic diameters (Dh) of the polymer particles during temperature cycles. Particle Dh reversibility data will be collected between 2 temperatures (15 and 90° C.) by performing ramp-up and down cycles between these 2 temperatures. The temperature ramp-up or down time between the terminals is 10 minutes.

The lower the variations in Dh before and after a temperature cycle (15° C.=>90° C.=>15° C.) (less than or equal to 100%), the more reversible the performance of thermo-swelling/thermo-aggregation.

Example 17-a: Elaboration of Particles from Sulfobetaines

The objectives of this test are to confirm the thermo-swelling and thermo-aggregating performances of the particles prepared from the monomers of the invention, in order to use them in conformance (see paragraph on "characterization of Dh").

A first series of polymers, crosslinked with 40 ppm of MBA, were produced according to the procedure described above. Table 1 summarizes the chemical compositions and characteristics of the various tests of Example 17-A.

TABLE 1

Compositions and characteristics of Tests 1-1, 1-2 1-3 and 1-4

| | | Molar composition | | | |
| --- | --- | --- | --- | --- | --- |
| | | Sulfobetaine | | Comonomer | |
| Test # | | Nature | Mol % | Nature | Mol % |
| 1-1 | Invention | MAAMPS | 30 | DEAEMA | 70 |
| 1-2 | Invention | MAMMPS | 30 | DEAEMA | 70 |
| 1-3 | Prior art | DMAPS | 30 | DEAEMA | 70 |
| 1-4 | Counter-example | MAAMPS prepared with OMSO and obtained according to counter-example 1 | 30 | DEAEMA | 70 |

TABLE 1-continued

Compositions and characteristics of Tests 1-1, 1-2 1-3 and 1-4

| | | | | | Characterizations | | | |
|---|---|---|---|---|---|---|---|---|
| | | Active matter (%) | Dh (nm)- 25° C.- 1 mg/mL in 0.3M NaCl | Bulk viscosity (12 rpm) | Visual observation of stability | | | |
| Test # | | | | | t = 0 | t = 1 month | t = 6 months | t = 12 months |
| 1-1 | Invention | 30 | 121 | <2000 cPs | Stable | Stable | Stable | Stable |
| 1-2 | Invention | 30 | 135 | <2000 cPs | Stable | Stable | Stable | Stable |
| 1-3 | Prior art | 30 | 180 | <2000 cPs | Stable | Stable | Stable | Demixion |
| 1-4 | Counter-example | 30 | 172 | <2000 cPs | Stable | Stable | Stable | Demixion |

Bulk viscosity is measured using a Brookfield viscometer (rotation speed: 12 rpm).

Figure 17:
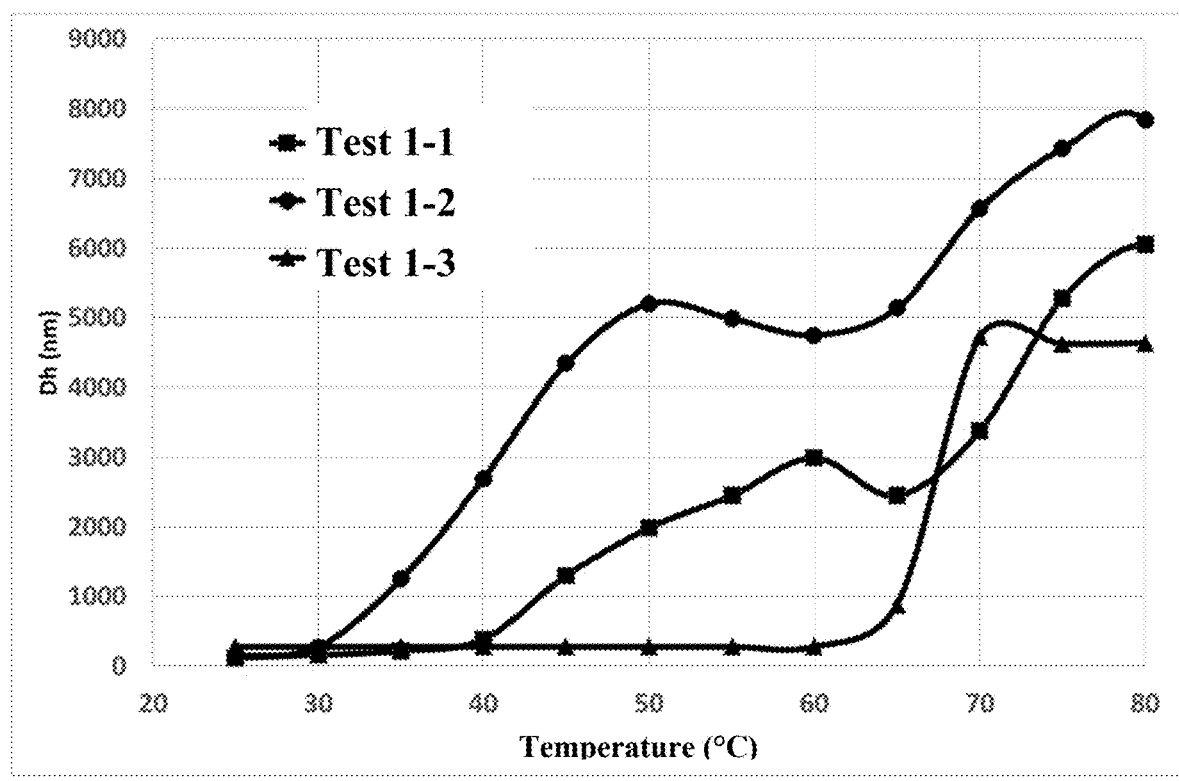
FIG. 17 corresponds to the graph of the variation of Dh of Tests 1-1, 1-2, 1-3 of Example 17A, at a concentration of 1 mg/mL as a function of temperature.

The graph in FIG. 17 highlights the variations in Dh for each of the tests, at a concentration of 1 mg/mL as a function of temperature.

This example demonstrates that the emulsions prepared from the monomers of the invention (Tests 1-1 and 1-2) are more storage-stable.

The highest Dh values were obtained with the polymer particles prepared from the monomers of the invention. The thermo-swelling and thermo-aggregating performances of the polymer particles of the counter-example are significantly lower than those obtained with the polymer particles of the invention. The thermo-swelling/thermo-aggregating activation temperatures of the polymer particles prepared from the monomers of the invention are more suited to areas of average field temperatures.

In conclusion, the particles prepared from the monomers of the invention (Tests 1-1 and 1-2) generate better thermo-swelling/thermo-aggregating performance than those of the prior art (Test 1-3) and of the counter-example (Test 1-4).

Example 17-B: Elaboration of Particles from Sulfobetaines

The objectives of this test were to confirm the thermo-swelling and thermo-aggregating performances of the particles (prepared from the monomers of the invention) at a molar composition different from that of Example 17-A.

A new series of crosslinked polymer particles based on sulfobetaines were developed. Table 2 below summarizes the chemical compositions of the polymers (crosslinked with 10 ppm of MBA) and the characteristics of the various tests of Example 17-B. The synthesis protocol is that described at the beginning of Example 17.

TABLE 2

Compositions and characteristics of Tests 2-1, 2-2.

| | | Molar composition | | | |
|---|---|---|---|---|---|
| | | Sulfobetaine | | Comonomer | |
| Test # | | Nature | Mol % | Nature | Mol % |
| 2-1 | Invention | MAAMPS | 10 | DEAEMA | 90 |
| 2-2 | Invention | MAMMPS | 10 | DEAEMA | 90 |

| | | | | | Characterizations | | | |
|---|---|---|---|---|---|---|---|---|
| | | Active matter (%) | Dh (nm)- 25° C.- 1 mg/mL in 0.3M NaCl | Bulk viscosity (12 rpm) | Visual observation of stability | | | |
| Test # | | | | | t = 0 | t = 1 month | t = 6 months | t = 12 months |
| 2-1 | Invention | 30 | 115 | <2000 cPs | Stable | Stable | Stable | Stable |
| 2-2 | Invention | 30 | 120 | <2000 cPs | Stable | Stable | Stable | Stable |

Figure 18:
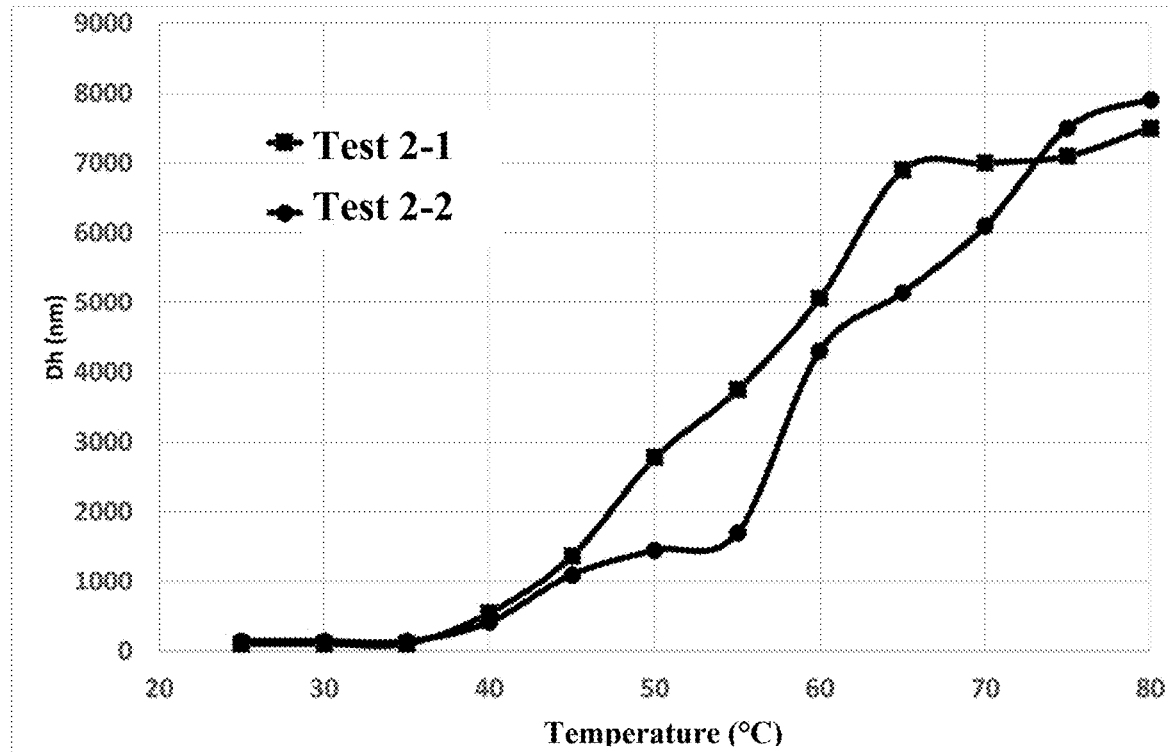
FIG. 18 corresponds to the graph of the variation of Dh of Tests 2-1 and 2-2 of Example 17B, at a concentration of 1 mg/mL as a function of temperature.

The graph in FIG. 18 highlights the variations of the Dh of each of the tests, at a concentration of 1 mg/mL as a function of the temperature.

This new example highlights high final Dh values and activation temperatures compatible with most reservoirs (subterranean formations).

This demonstrates once again that the emulsions prepared from the monomers of the invention (Tests 2-1 and 2-2) generate, once dispersed in brines, thermo-swelling/thermo-aggregating performances at monomeric molar compositions different from those of Example 17-A.

Example 17-C Preparation of Particles from Sulfobetaines Crosslinked with Dimethacrylates The objectives of this test are to confirm the thermo-swelling and thermo-aggregating performances of the particles prepared from the monomers of the invention, but crosslinked with a crosslinker different from that of Test 17-B.

Table 3 below summarizes the new chemical compositions of the polymers crosslinked with 10 ppm of EGDMA and the characteristics of the various tests of Example 17-C. The polymer synthesis protocol is that described at the beginning of Example 17.

TABLE 3

Compositions and characteristics of Tests 3-1 and 3-2

| Test # | Molar composition | | | |
|---|---|---|---|---|
| | Sulfobetaine | | Comonomer | |
| | Nature | Mol % | Nature | Mol % |
| 3-1 Invention | MAAMPS | 10 | DEAEMA | 90 |
| 3-2 Invention | MAMMPS | 10 | DEAEMA | 90 |

| | Characterizations | | | |
|---|---|---|---|---|
| Test # | Active matter (%) | Dh (nm)- 25° C.- 1 mg/mL in 0.3M NaCl | Bulk viscosity (12 rpm) | Dh (nm) |
| | | | | Ambient temperature / 80° C. |
| 3-1 Invention | 30 | 115 | <2000 cPs | 140 / 7000 |
| 3-2 Invention | 30 | 120 | <2000 cPs | 135 / 6500 |

It is observed that the increase in temperature induces a very significant increase in Dh. This third example demonstrates that the emulsions prepared from the monomers of the invention perform well even when they are crosslinked with a crosslinker of the methacrylate type.

Example 17-D: Reversibility of the Conformance Performances of the Particles of Crosslinked Polymers Based on MAAMPS or MAMMPS Sulfobetaines The objectives of this test are to confirm the reversibility properties of the thermo-swelling and thermo-aggregating performances of the particles according to successive temperature ramp-up and down cycles.

Table 4 below summarizes the new chemical compositions of the crosslinked copolymers with 40 ppm of MBA and the characteristics of the various tests of the example. The synthesis protocol is that described at the beginning of Example 17.

TABLE 4

Compositions and characteristics of Tests 4-1 and 4-2

| Test # | Molar composition | | | |
|---|---|---|---|---|
| | Sulfobetaine | | Comonomer | |
| | Nature | Mol % | Nature | Mol % |
| 4-1 Invention | MAAMPS | 30 | DEAEMA | 70 |
| 4-2 Invention | MAMMPS | 30 | DEAEMA | 70 |

| Test # | Characterizations | | | |
|---|---|---|---|---|
| | Active matter (%) | Dh (nm)- 15° C.- 1 mg/mL in 0.3M NaCl | Dh (μm)- 90° C.- 1 mg/mL in 0.3M NaCl) | Bulk viscosity (12 rpm) |
| 4-1 Invention | 30 | 121 | >5 | <2000 cP |
| 4-2 Invention | 30 | 135 | >5 | <2000 cP |

Figure 19:
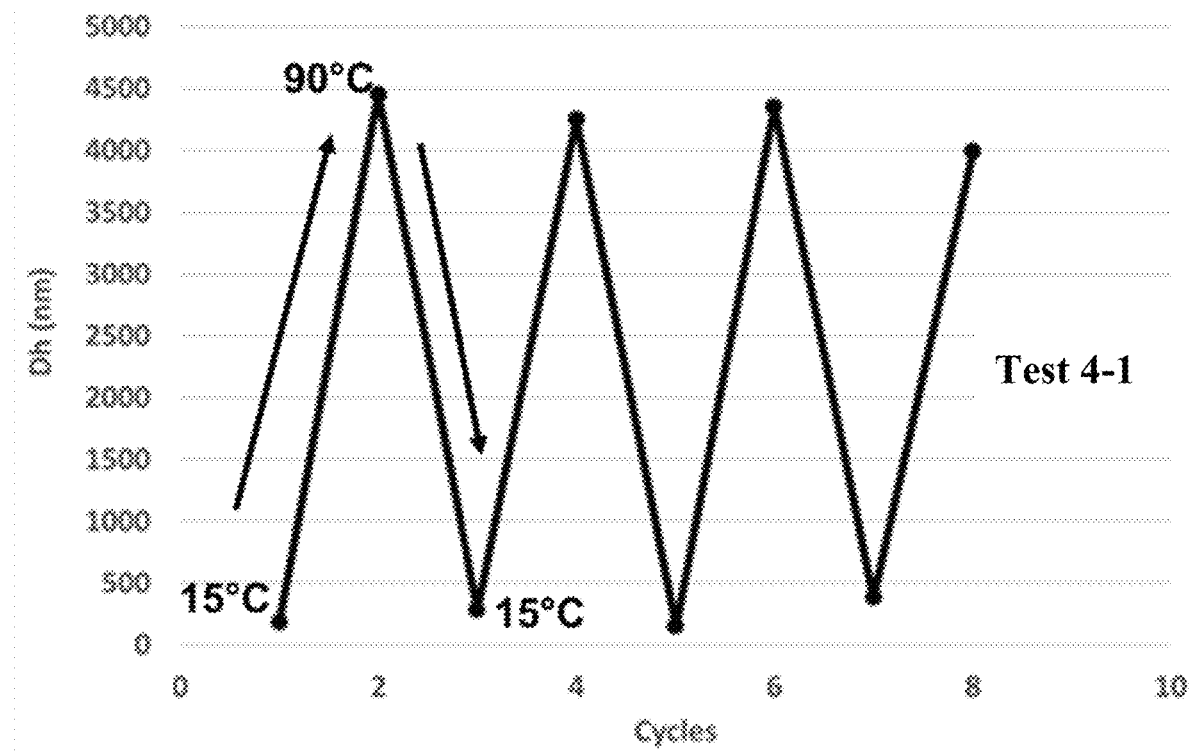
FIG. 19 corresponds to the graph of the variation of Dh of Test 4-1 of Example 17D during the reversibility test of thermo-swelling and thermo-aggregating properties (temperature cycle from 15 to 90° C. then at 15° C.).
Figure 20:
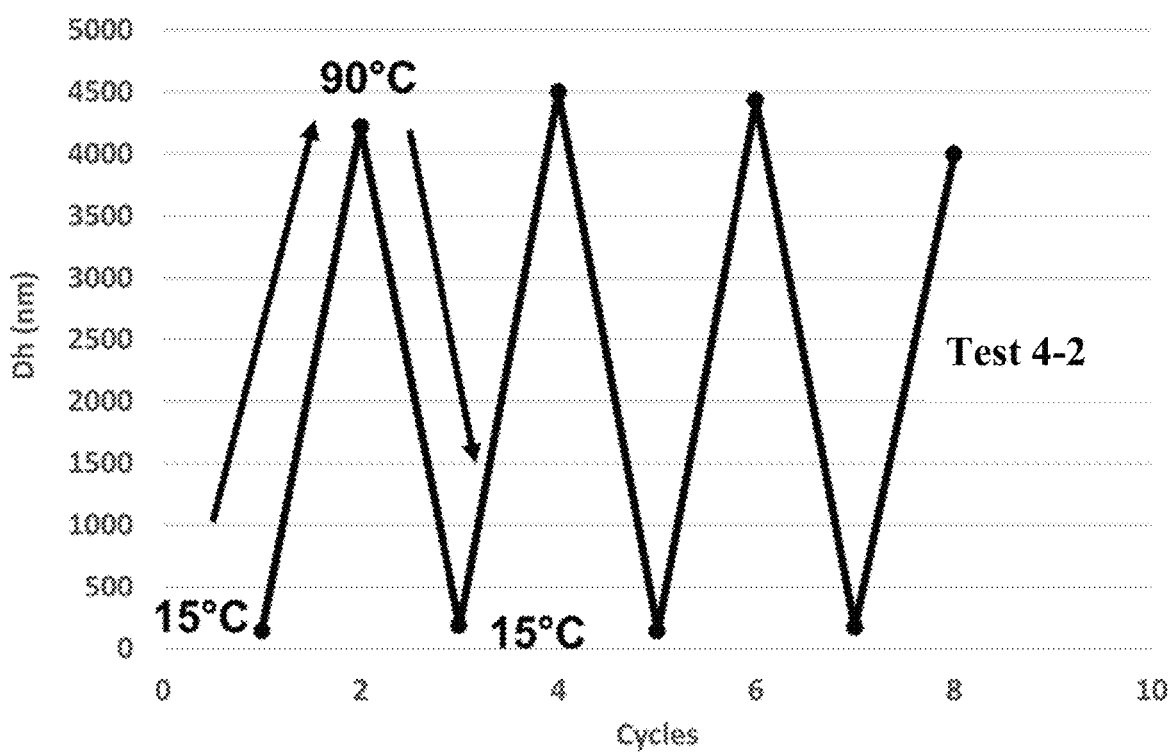
FIG. 20 corresponds to the graph of the variation of Dh of Test 4-2 of Example 17D during the reversibility test of thermo-swelling and thermo-aggregating properties (temperature cycle from 15 to 90° C. then at 15° C.).

The reversibility of the thermo-swelling/thermo-aggregating properties of the polymer particles was evaluated according to the protocol described at the beginning of Example 17. The results obtained are collated in the graphs of FIGS. 19 (Test 4-1) and 20 (Tests 4-2). The reversibility properties of thermo-swelling and thermo-aggregating were established with temperature ramp-up and down cycles between 15° C. and 90° C.

It is observed that the Dh values before and after the temperature cycles are equivalent. This fourth example demonstrates that the polymer particles of the emulsions prepared from the monomers of the invention have reversible properties (depending on the temperature) of thermo-swelling and thermo-aggregation. This reversibility property obtained with the particles prepared from the monomers of the invention, makes it possible to modulate the performances according to the temperature variations of the same reservoir.

Example 17-E: Performances in a Porous Medium of Crosslinked Polymer Particles Based on MAAMPS or MAMMPS Sulfobetaines The objectives of this test are to confirm the thermo-swelling and thermo-aggregating performances of particles in porous media.

Table 5 below summarizes the chemical composition of Tests 5-1 and 5-2 (crosslinked copolymers with 40 ppm of MBA). The synthesis protocol is that described above.

TABLE 5

Compositions and characteristics of Tests 5-1 and 5-2

| Test # | Molar composition | | | |
|---|---|---|---|---|
| | Sulfobetaine | | Comonomer | |
| | Nature | Mol % | Nature | Mol % |
| 5-1 Invention | MAMMPS | 30 | DEAEMA | 70 |
| 5-2 Prior art | DMAPS | 30 | DEAEMA | 70 |

The characteristics of the injection test in a porous medium used for the injection of the dispersion at 1000 active ppm of polymer 5-1 are:

Flow (Q)=12 cm³/h

Shear: 50 s⁻¹

Internal velocity: 2.4 m/day

Porosity: 33%

Permeability: 1290 mD

Figure 21:
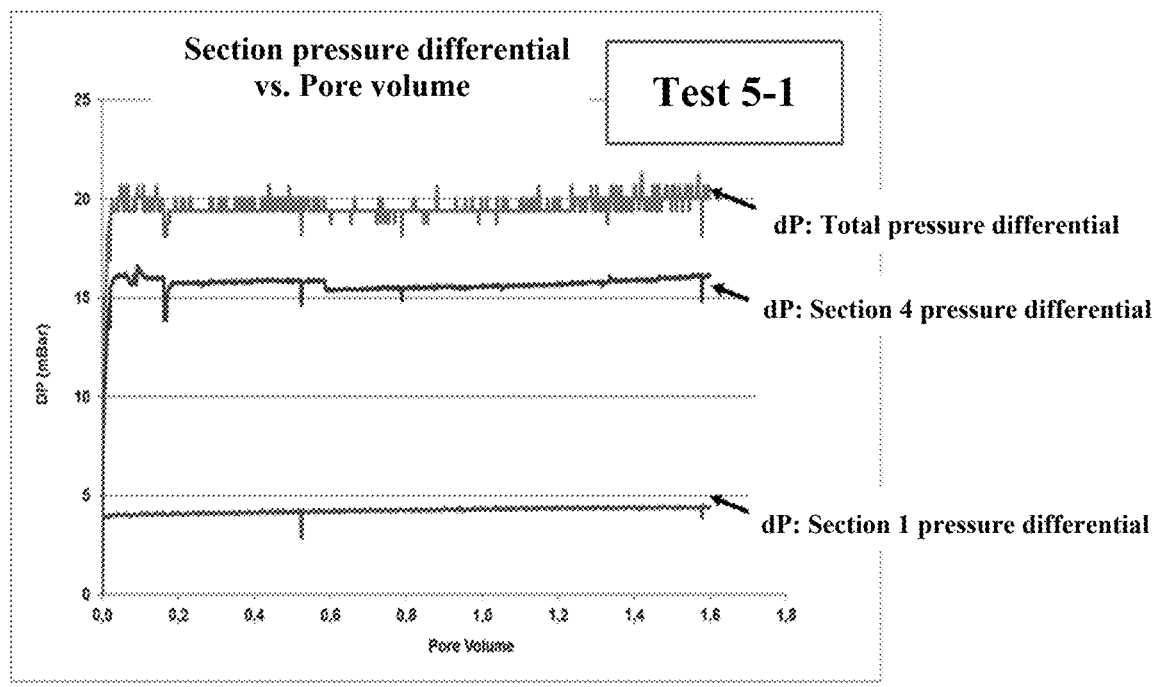
FIG. 21 corresponds to the graph of the pressure differential variation dP for Test 5-1 of Example 17-E.

The evolution of the pressure inside the porous medium as a function of the pore volume is recorded. FIG. 21 corresponds to the graph of evolution of the pressure differential dP between the inlet and the outlet of the porous medium.

It should be noted that the total pressure differential dP is constant, which confirms that the particles of Test 5-1 inject and propagate well in porous media at room temperature.

Figure 22:
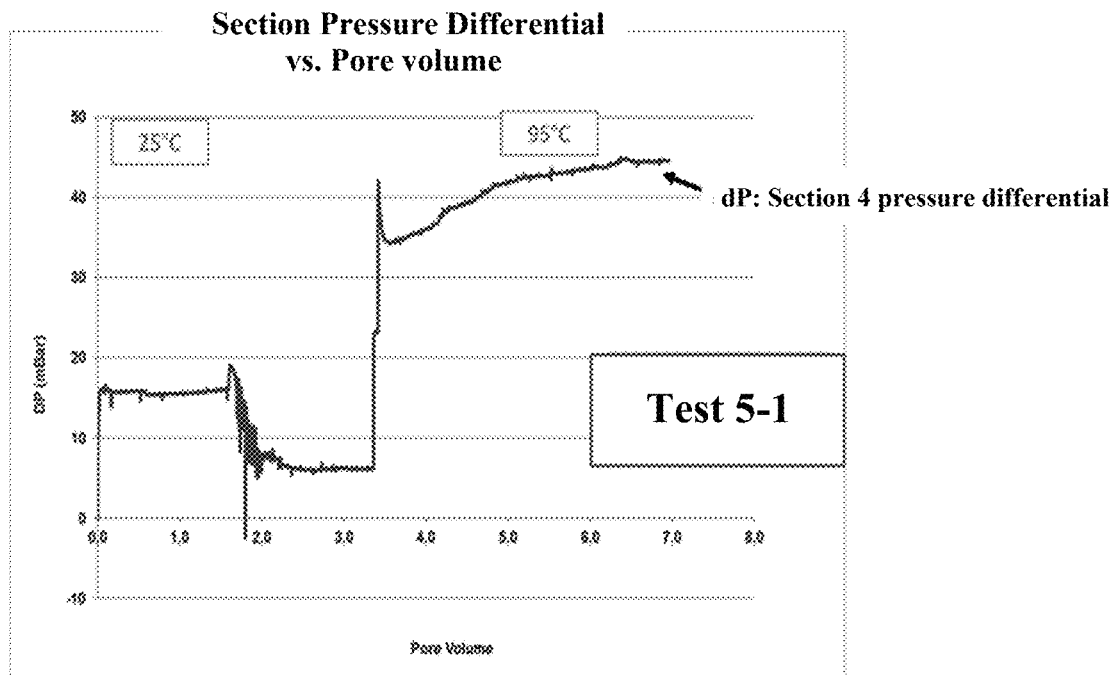
FIG. 22 corresponds to the graph of the pressure differential variation dP for Test 5-2 of Example 17-E at temperatures of 25° C. and 95° C.

The evolution of the pressure inside the porous medium as a function of the temperature is recorded. FIG. 22 corresponds to the graph of the evolution of the pressure differential dP between the inlet and the outlet of the porous medium, as a function of the temperature with a change from 25° C. to 95° C.

The graph in FIG. 22 highlights an increase in the pressure differential inside the section with temperature (from 25° C. to 95° C.). This confirms the thermo-swelling and thermo-aggregating performances of the particles of Test 5-1 as a function of temperature.

In conclusion, this Example 17-E demonstrates that the emulsions of polymer particles prepared from the monomers of the invention have propagating, thermo-swelling and thermo-aggregating properties in a porous medium.

Example 18: Dishwashing Liquid Formulated from a MAAMPS Copolymer

The detergent industry formulates foaming products from many raw materials including surfactants. Excipients may be added to the formulations by a person skilled in the art in order to increase the foaming properties of the formulations, or even to stabilize the foam formed.

The objectives of this new test are to evaluate the foaming and stabilizing properties of the foams formed in the presence of greasy residues, of additives prepared from one of the monomers of the invention.

An acrylamide (AM) and MAAMPS copolymer was prepared by conventional radical polymerization in solution in water. The chemical composition is collated in Table 6.

TABLE 6

Chemical composition of Test 6-1

| | Molar composition | | | | Characterizations |
|---|---|---|---|---|---|
| | Sulfobetaine | | Comonomer | | Active |
| Test # | Nature | Mol % | Nature | Mol % | matter (%) |
| 6-1 | Invention MAAMPS | 50 | AM | 50 | 20 |

First, an aqueous stock solution containing 2000 by mass of surfactants (mixture of Sodium Lauryl Ether Sulfate, Amine Oxide) is prepared. The different daughter solutions (from A to E) are then formulated by adding different % by mass of the copolymer 6-1, and listed in Table 7.

TABLE 7

Composition of polymer 6-1 in surfactant solutions

| Surfactant solutions | % by mass of copolymer 6-1 |
|---|---|
| A | 0 |
| B | 0.1 |
| C | 0.25 |
| D | 0.5 |
| E | 1 |

Solutions A to E are then prepared according to the formulas detailed in Table 8.

TABLE 8

Composition of Tests F, G, H, I and J

| | | Composition | |
|---|---|---|---|
| | Deionized | Tested daughter solutions | |
| Tests | water (mL) | Reference | Weighted masses (g) |
| F | 200 | A | 0.2 |
| G | 200 | B | 0.2 |
| H | 200 | C | 0.2 |
| I | 200 | D | 0.2 |
| J | 200 | E | 0.2 |

Formulations F, G, H, I, and J are respectively packaged in graduated test tubes. At the beginning, the volume of each of the solutions occupies 1/3 of the volume of the test tube. Nine cycles of twenty rotations (30 rpm) each are then carried out on each of the test tubes. At the end of each cycle, five milliliters of olive oil are added to each test tube (i.e., a total of 40 mL, at the end of the procedure). The foam heights of Tests G, H, I, J are then measured and compared with that of Test F. The results obtained are collated in Table 9.

TABLE 9

Foam gain of Tests G, H, I and J

| Tests | % Increase in foam height compared to Test F |
|---|---|
| G | +88% |
| H | +106% |
| I | +53% |
| J | +24% |

The results obtained show a significant increase in foam compared to reference F. This new example confirms the foaming and foam-stabilizing properties of the copolymer prepared from the sulfobetaine monomers of the invention.

Example 19: Retaining Agent in Paper Applications

The paper industry formulates paper pulp. Retaining and drainage additives are generally added to the formulations.

The objectives of this new test are to evaluate the properties of total retention (FPR, fibers+mineral fillers), mineral filler retention (First Pass Ash Retention (FPAR)) and vacuum drainage (Dynamic Drainage Analyzer (DDA)). Regarding FPR and FPAR, the higher the values, the better the performance. For DDA, the lower the drainage value, the better the performance.

The polymers below were synthesized following the procedure described in Example 1. The formulation of the 7-0 Test does not contain any polymer. Table 10 summarizes the chemical compositions and the performances (concentration of 0.25% by mass in the paper formulation) of the various tests. The molar masses of the different copolymers are comparable and of the same order of magnitude.

TABLE 10

Compositions and performances of the tests

| | | Molar composition | | | | | | Performances | | |
|---|---|---|---|---|---|---|---|---|---|---|
| | | Comonomer 1 | | Comonomer 2 | | Sulfobetaine | | | | |
| Test # | Nature | Nature | Mol % | Nature | Mol % | Nature | Mol % | FPR (%) | FPAR (%) | DDA (%) |
| 7-6 | References | TEST WITHOUT POLYMER | | | | | | 71.8 | 4.2 | 36.1 |
| 7-7 | Invention | ADC | 15 | AM | 80 | MAAMPS | 5 | 84.1 | 60.8 | 20.2 |
| 7-8 | Invention | ADC | 15 | AM | 80 | MAMMPS | 5 | 81.6 | 46 | 23 |
| 7-10 | Invention | ADC | 38 | AM | 57 | MAAMPS | 5 | 78.2 | 32.1 | 21.6 |
| 7-11 | Invention | ADC | 38 | AM | 57 | MAMMPS | 5 | 77.3 | 27.3 | 25.1 |

The tests according to the invention generate higher FPAR and FPR values than the reference, and lower DDA values than the reference. This new example demonstrates that the terpolymers prepared from the sulfobetaine monomers of the invention demonstrate good performance in total retention, filler retention and vacuum drainage.

Example 20: High Viscosity Additive (HVFR) for Hydraulic Fracturing

The hydraulic fracturing industry uses many additives including friction reducers which induce high viscosities in saline aqueous media (High-Viscosity Friction Reducer (HVFR)). The objectives of this example are to formulate hydraulic fracturing fluids from additives (of the invention and the prior art) and to see the "bulk" viscosity levels obtained.

The polymers described in Table 11 were synthesized by following the procedure described in Example 1. Table 11 summarizes the chemical compositions and the characteristics of each of the tests. The molar masses of the different copolymers are comparable and of the same order of magnitude.

TABLE 11

Compositions and performances of the tests

| | | Molar composition | | | | | | Characterizations | |
|---|---|---|---|---|---|---|---|---|---|
| | | Comonomer 1 | | Comonomer 2 | | Sulfobetaine | | Active | Bulk |
| Test # | Nature | Nature | Mol % | Nature | Mol % | Nature | Mol % | matter (%) | visco. (cP) |
| 8-4 | Invention | ADC | 15 | AM | 80 | MAAMPS | 5 | 35 | 1280 |
| 8-5 | Invention | ADC | 15 | AM | 80 | MAMMPS | 5 | 35 | 1320 |
| 8-6 | Prior art | ADC | 15 | AM | 85 | — | 0 | 35 | 1280 |

Table 12 summarizes Fann viscosities at 4 and 6 Gallon Per Thousand (GPT) in different brines. Brine 1 is composed of sodium chloride (30 g/L,) and calcium dichloride (3 g/L). Brine 2 is composed of sodium chloride (85 g/L,) and calcium dichloride (33 g/L).

TABLE 12

| | Fann viscosities | | | | | | | |
|---|---|---|---|---|---|---|---|---|
| | Fann viscosity (cP) Brine 1 | | | | Fann viscosity (cP) Brine 2 | | | |
| Test # | 4 GPT @ 511 s⁻¹ | 6 GPT @ 511 s⁻¹ | 4 GPT @ 100 s⁻¹ | 6 GPT @ 100 s⁻¹ | 4 GPT @ 511 s⁻¹ | 6 GPT @ 511 s⁻¹ | 4 GPT @ 100 s⁻¹ | 6 GPT @ 100 s⁻¹ |
| 8-1 Invention | 3.8 | 5.3 | 4.8 | 7.1 | 4.4 | 6.8 | 5.5 | 9.5 |
| 8-2 Invention | 2.8 | 3.3 | 3.2 | 5.7 | 3 | 4.9 | 3.5 | 5.7 |
| 8-3 Prior art | 2.5 | 2.5 | 2.5 | 2.5 | 2.5 | 3 | 2.5 | 2.5 |

The Fann viscosities, in centipoise (cP) are measured at 20° C. using the Chandler Engineering model 3500 viscometer which is equipped with the RIB1 module (Rotor 1 Bob 1). The values of the Fann viscosities at shear rates of 511 and 102 s⁻¹ are extrapolated by applying the angular velocities of 300 and 60 rpm respectively.

Tests 8-1 and 8-2 generate higher Fann viscosities than for Tests 8-3, whatever the shear (100 or 511 s−1) and the dosage (4 or 6 Gallon per Thousand). This new example demonstrates that hydraulic fracturing fluids of the (HVFR) type, formulated from emulsions produced from the monomers of the invention, have higher Fann viscosities than those of fluids prepared from emulsions of the prior art and thus offer better performance in the intended application.

The invention claimed is:

1. A process for preparing a sulfobetaine monomer of formula (V) and/or its acid form comprising reacting:
   a compound of formula (VI), and
   a compound of formula (VII) and/or one of its salts,
   optionally in the presence of at least one solubilizing agent of the compound of formula (VII), and
   in the presence of at least one solvent, wherein the said solvent is a compound having a melting temperature below 15° C.,
   wherein the reaction is carried out with an amount of polymerization inhibitor of between 10 and less than 500 ppm relative to the total mass of the compounds of formulas (VI) and (VII),

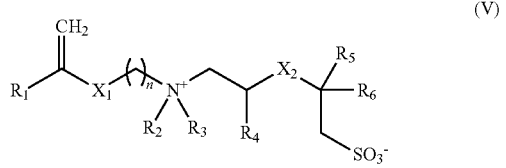

In formulas (V), (VI) and (VII):
$R_1$ and $R_4$ are, independently of each other, —H or —$CH_3$,
$R_2$ and $R_3$ are, independently of each other, a linear C1-C10 alkyl or branched C3-C10 alkyl or linear C2-C10 alkylene group,
$R_5$ is —H, or a linear C1-C22 alkyl or branched C3-C22 alkyl group, or $R_5$ forms with $R_6$ a C4-C10 carbon ring, optionally branched,
$R_6$ is a linear C1-C22 alkyl or branched C3-C22 alkyl group, or $R_6$ forms with $R_5$ a C4-C10 carbon ring, optionally branched,
$X_1$=—COO—, or —CONH— or —$CH_2$—,
$X_2$=—COO— or —CONH—,
n is an integer between 0 and 10,
wherein
the compound of formula (VI) is chosen from dimethylaminopropyl methacrylamide, dimethylaminopropyl acrylamide, allyldimethylamine, diallylmethyl amine, dimethylaminoethyl methacrylate, and dimethylaminoethyl acrylate;
the compound of formula (VII) is 2-acrylamido-2-methylpropane sulfonic acid and/or one of its salts; and
the polymerization inhibitor is mono methyl ether of hydroquinone (MEHQ),
and wherein said process comprises carrying out the following steps:
a1) adding to a stirred reactor at least one compound of the formula (VI), optionally at least one solubilizing agent of the compound of the formula (VII), and the at least one solvent to obtain a pre-reaction mixture;
a2) adding at least one compound of the formula (VII) and/or one of its salts to the pre-reaction mixture;
a3) after reaction, obtaining sulfobetaine monomers of the formula (V) and/or its acid form in the form of a solution;
a4) extracting the compound of the formula (V) in the form of crystals AA;
a5) combining the crystals AA of the compound of formula (V) with an aqueous solution to form a suspension A;
a6) mixing suspension A for a period of between 1 minute and 20 hours;
a7) obtaining a suspension B of crystals BB of the compound of formula (V) in a hydrated form; and
a8) optionally isolating the crystals BB obtained from suspension B.

2. A process for preparing a sulfobetaine monomer of formula (V) and/or its acid form comprising reacting:
   a compound of formula (VI), and
   a compound of formula (VII) and/or one of its salts,
   optionally in the presence of at least one solubilizing agent of the compound of formula (VII), and in the presence of at least one solvent, wherein the said solvent is a compound having a melting temperature below 15° C., wherein the reaction is carried out with an amount of polymerization inhibitor of between 10 and less than 500 ppm relative to the total mass of the compounds of formulas (VI) and (VII),

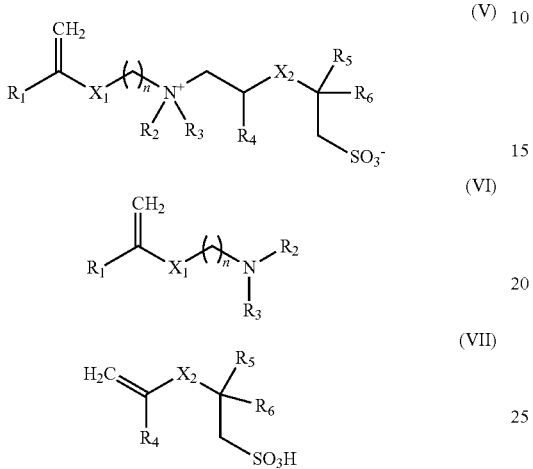

In formulas (V), (VI) and (VII):

$R_1$ and $R_4$ are, independently of each other, —H or —$CH_3$, $R_2$ and $R_3$ are, independently of each other, a linear C1-C10 alkyl or branched C3-C10 alkyl or linear C2-C10 alkylene group, $R_5$ is —H, or a linear C1-C22 alkyl or branched C3-C22 alkyl group, or $R_5$ forms with $R_6$ a C4-C10 carbon ring, optionally branched, $R_6$ is a linear C1-C22 alkyl or branched C3-C22 alkyl group, or $R_6$ forms with $R_5$ a C4—C10 carbon ring, optionally branched, $X_1$=—COO—, or —CONH— or —$CH_2$—, $X_2$=—COO— or —CONH—, n is an integer between 0 and 10, wherein the compound of formula (VI) is chosen from dimethylaminopropyl methacrylamide, dimethylaminopropyl acrylamide, allyldimethylamine, diallylmethyl amine, dimethylaminoethyl methacrylate, and dimethylaminoethyl acrylate;

the compound of formula (VII) is 2-acrylamido-2-methylpropane sulfonic acid and/or one of its salts; and the polymerization inhibitor is mono methyl ether of hydroquinone (MEHQ), and wherein said process comprises carrying out the following steps:

a1) adding to a stirred reactor at least one compound of the formula (VI), optionally at least one solubilizing agent of the compound of formula (VII), and the at least one solvent to obtain a pre-reaction mixture;

a2) adding at least one compound of the formula (VII) and/or one of its salts to the pre-reaction mixture;

a3) after reaction, obtaining sulfobetaine monomers of the formula (V) and/or its acid form in the form of a suspension of crystals AA;

a5) combining the crystals AA of the compound of the formula (V) with an aqueous solution to form a suspension A;

a6) mixing suspension A for a period of between 1 minute and 20 hours;

a7) obtaining a suspension B of crystals BB of the compound of the formula (V) in a hydrated form; and a8) optionally isolating the crystals BB obtained from suspension B.

* * * * *